US010780633B2

(12) United States Patent
Olubummo et al.

(10) Patent No.: US 10,780,633 B2
(45) Date of Patent: *Sep. 22, 2020

(54) 3D PRINTING

(71) Applicant: HEWLETT-PACKARD DEVELOPMENT COMPANY, L.P., Houston, TX (US)

(72) Inventors: Adekunle Olubummo, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 40 days.

This patent is subject to a terminal disclaimer.

(21) Appl. No.: 16/080,233

(22) PCT Filed: Jun. 13, 2017

(86) PCT No.: PCT/US2017/037135
§ 371 (c)(1),
(2) Date: Aug. 27, 2018

(87) PCT Pub. No.: WO2018/144054
PCT Pub. Date: Aug. 9, 2018

(65) Prior Publication Data
US 2019/0016043 A1   Jan. 17, 2019

Related U.S. Application Data

(63) Continuation-in-part of application No. PCT/US2017/027881, filed on Apr. 17, 2017, and a
(Continued)

(51) Int. Cl.
*B29C 64/165* (2017.01)
*B29C 64/214* (2017.01)
(Continued)

(52) U.S. Cl.
CPC .......... *B29C 64/165* (2017.08); *B29C 64/214* (2017.08); *B29C 64/218* (2017.08);
(Continued)

(58) Field of Classification Search
CPC .... C07F 15/045; C07F 321/18; B29C 64/165; B29C 64/214; B29C 64/218; B29C 64/393; B33Y 10/00; C07C 321/18
See application file for complete search history.

(56) References Cited

U.S. PATENT DOCUMENTS 3,875,199 A    4/1975  Bloom
5,024,923 A *  6/1991  Suzuki ............... C09D 5/32
                                               252/587

(Continued)

FOREIGN PATENT DOCUMENTS

DE   4202037 A1   7/1993
EP   0410443 A1   1/1991
(Continued)

OTHER PUBLICATIONS

Aragoni, M.C. et al., NIR Dyes Based on [M(R,R'timdt)2] Metal-Dithiolenes: Additivity of M. R. and R'Contributions To Tune the NIR Absorption (M =Ni, Pd, Pl: R,R'timdt =Monoreduced Form of Disubstituted Imidazolidine-2,4,5-trithione), May 13, 2003, <http://onlinelibrary.wiley.com/doi/10.1002/eiic200200602/full>.
(Continued)

*Primary Examiner* — Bijan Ahvazi
(74) *Attorney, Agent, or Firm* — HPI Patent Department

(57) ABSTRACT

Compositions and methods for 3D printing are described herein. In an example, a composition for 3D printing can comprise a build material comprising at least one polymer and at least one first electron donor compound; and a fusing agent comprising (i) a metal bis(dithiolene) complex, (ii) at least one surfactant, at least one second electron donor
(Continued)

compound, or combinations thereof, (iii) a polar aprotic solvent, and (iv) water. The at least one first electron donor compound and the at least one second electron donor compound can be the same or different.

17 Claims, 4 Drawing Sheets

Related U.S. Application Data continuation-in-part of application No. PCT/US2017/016681, filed on Feb. 6, 2017.

(51) Int. Cl.
    *B29C 64/218*     (2017.01)
    *B33Y 50/02*     (2015.01)
    *B33Y 30/00*     (2015.01)
    *B33Y 70/00*     (2020.01)
    *B33Y 10/00*     (2015.01)

(52) U.S. Cl.
    CPC ............... *B33Y 10/00* (2014.12); *B33Y 30/00* (2014.12); *B33Y 50/02* (2014.12); *B33Y 70/00* (2014.12)

(56) References Cited

U.S. PATENT DOCUMENTS

| | | | |
|---|---|---|---|
| 7,026,017 B2 | 4/2006 | Wolf et al. | |
| 7,204,941 B2 | 4/2007 | Hall et al. | |
| 7,282,164 B2 | 10/2007 | Hall et al. | |
| 8,853,314 B2 | 10/2014 | Mamak et al. | |
| 9,144,940 B2 | 9/2015 | Martin | |
| 9,260,614 B2* | 2/2016 | Reichelt | C07D 233/84 |
| 9,482,974 B2 | 11/2016 | Martin | |
| 2009/0121031 A1 | 5/2009 | Hall et al. | |
| 2012/0313058 A1 | 12/2012 | Masuhara et al. | |
| 2016/0198576 A1* | 7/2016 | Lewis | B29C 64/00 361/761 |
| 2016/0333181 A1* | 11/2016 | Sybert | C08L 69/005 |
| 2017/0022349 A1 | 1/2017 | Mii et al. | |
| 2019/0092799 A1* | 3/2019 | Olubummo | B29C 64/165 |

FOREIGN PATENT DOCUMENTS

| | | | | |
|---|---|---|---|---|
| EP | 2942378 B1 | 8/2016 | | |
| EP | 3067216 A1 | 9/2016 | | |
| WO | WO-2009059900 A2 | 5/2009 | | |
| WO | 2010046285 A2 | 4/2010 | | |
| WO | WO-2012069518 | 5/2012 | | |
| WO | 2016068899 A1 | 5/2016 | | |
| WO | WO-2016068899 A1 * | 5/2016 | ........... B29C 67/247 |
| WO | WO-2017014785 A1 | 1/2017 | | |
| WO | WO-2017023283 A1 | 2/2019 | | |

OTHER PUBLICATIONS

FY, J. et al., Strong two-photon absorption at telecommunications wavelengths in nickel bis(dithiolene) complexes. OPICS LETTRS. 2007, Vo. 32, No. 6, pp. 671-673, especially p. 671., fig. 1,3.

Mebrouk, K et al., Water-soluble nickel-bis (dithiolene) complexes as photothermal agents. Chem. Commun. 2014, DOI: 10-1039/c4cc08231a, pp. 1-3 especially fig. 1,2.

* cited by examiner

EMR EXPOSURE

3D PRINTING

BACKGROUND

Three-dimensional (3D) printing can be an additive printing process used to make three-dimensional object(s) or part(s) from a digital model. 3D printing is often used in rapid product prototyping, mold generation, and mold master generation. Some 3D printing techniques are considered additive processes because they involve the application of successive layers of material. This is unlike machining processes, which tend to rely upon the removal of material to create the final part.

Materials used in 3D printing tend to use curing or fusing, which for some materials may be accomplished using heat-assisted extrusion or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
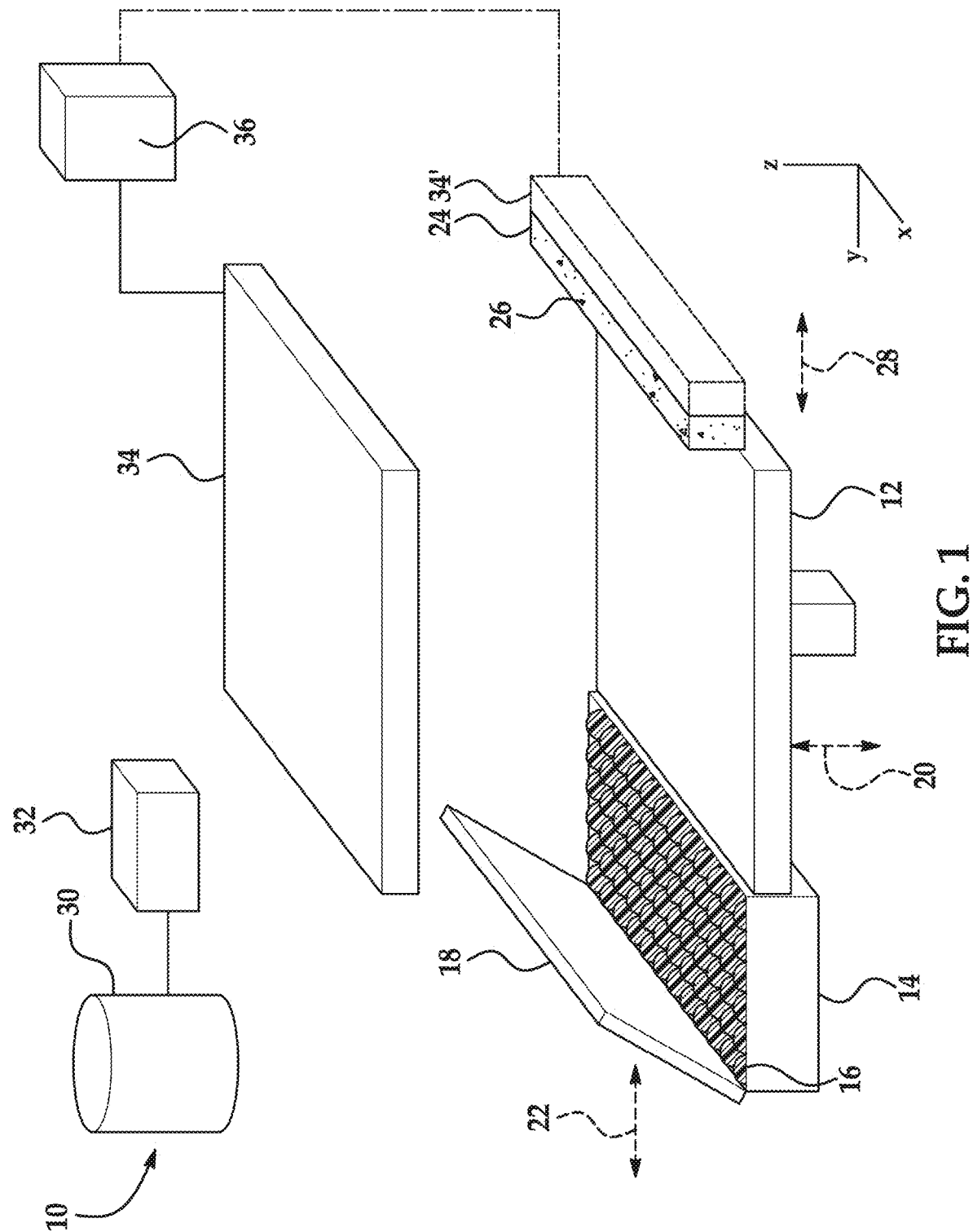
FIG. 1 is a simplified isometric and schematic view of an example of a 3D printing system disclosed herein.

In an example of three-dimensional (3D) printing disclosed herein, Multi Jet Fusion (MJF) technology can be used. In an example of an MJF process, a layer of a build material (also referred to as build material particles) is exposed to radiation, but a selected region (in some instances less than the entire layer) of the build material is fused and hardened to become a layer of a 3D part(s) or object(s).

A fusing agent (e.g., carbon black) can be selectively deposited in contact with the selected region of the build material. The fusing agent(s) is capable of penetrating into the layer of the build material and spreading onto the exterior surface of the build material. This fusing agent is capable of absorbing radiation and converting the absorbed radiation to thermal energy, which in turn melts or sinters the build material that is in contact with the fusing agent. This causes the build material to fuse, bind, and cure to form the layer of the 3D part.

As used herein, the terms "3D printed part," "3D part," "part," "3D printed object," "3D object," or "object" may be a completed 3D printed part or a layer of a 3D printed part.

As used herein, "(s)" at the end of some terms indicates that those terms/phrases may be singular in some examples or plural in some examples. It is to be understood that the terms without "(s)" may be also be used singularly or plurally in many examples.

Some fusing agents used in 3D printing tend to have significant absorption (e.g., 80%) in the 700 nm-1400 nm light absorbing range. This absorption generates heat suitable for fusing during 3D printing, which leads to 3D parts having mechanical integrity and relatively uniform mechanical properties (e.g., strength and/or elongation at break). This absorption, however, results in strongly colored, e.g., black, 3D parts. In some instances, it may not be necessary to generate strongly colored parts. Rather, it may be appropriate to generate a part that is clear, white, off-white, or some color other than black.

To meet the 3D printing process(es) for a fusing agent and printing colorless or white parts, a near-infrared dye should be physically and chemically stable, compatible with ink vehicles and co-solvents to give a good jetting performance, and colorless after printing. The formulated agent(s) based on this kind of near-infrared dye(s) can be referred to as fusing agent(s). Metal bis(dithiolene) compound(s) can be used for this purpose. In some examples, nickel bis(dithiolene) can be used, which in its neutral state is a good near-infrared material to use in 3D printing but it is not water soluble and has a green color.

Nickel bis(dithiolene) can be reduced to the monoanion state to become water soluble and with further reduction to a dianion, nickel bis(dithiolene) becomes colorless. Nickel bis(dithiolene) can be reduced with secondary or tertiary amines. However, the reduction process is slow even at higher temperatures of about 80° C. to about 100° C. because these complexes are partially soluble in such amines.

In some examples, dodecanethiol and/or hindered amine light stabilizers can be used to bring the metal bis(dithiolene) complex into the amine (e.g., hydroxyethyl-2-pyrrolidone) phase, which can result in reducing the complex to its monoanion state within seconds.

In some examples described herein, electron donor compounds (e.g., hindered amine light stabilizers) can not only enhance the discoloration of the nickel bis(dithiolene) complex used as fusing agent(s) to enable printing of white and colored 3D objects but can also reduce and/or eliminate the oxidation of the build material comprising polymer(s) by scavenging free radicals (e.g., active alkyl and peroxy) that are generated during the thermal processing of the polymer(s) during 3D printing. During 3D printing, polymer(s) can be subjected to processing at high temperatures in the presence of oxygen, which can lead to oxidation of the polymer(s). The oxidative effects can reduce the strength of the 3D part and affect the color of the 3D part. Inhibition and/or reduction of the oxidative effects is a goal which can be achieved by the use of electron donating compounds which can be incorporated into the build material comprising polymer(s).

In some examples, addition of an electron donating compound to the polymer(s) in the build material can help to achieve reduction and discoloration of the dithiolene complex enabling 3D printing at higher contone levels (which refers to the number of drops, which is divided by 256, that will be placed on average onto each pixel), which can generate increased fusing of the 3D printed parts and stronger parts. The presence of the electron donating compound can also reduce the oxidative degradation of the polymer(s) in the build material and reduce photo-oxidation of the dithiolene complex which may occur during 3D printing process.

When fusing agents comprising the reduced metal bis(dithiolene) complex for 3D printing at contone levels ranging from about 20 to about 60, the metal bis(dithiolene)

can be reduced to a colorless form and can thus produce a colorless part. However, at higher contone levels from about 80 or higher, the completion of discoloration of the 3D part is not fast enough leaving some residual color in 3D parts, which may not be suitable for customers.

As described herein in this disclosure, when an electron donor compound is added to the build material, it can enhance the discoloration of the fusing agent when printing at higher contone level, generating functional white or colored parts with good mechanical performance. Further, adding the electron donor compound can also reduce the oxidative degradation of the polymer in the build material during thermal processing. However, when an electron donor compound is not added to the build material when printing at contone levels of 80 or higher, the 3D part may maintain a reddish brown color.

3D Printing Composition(s)

In some examples, a composition for 3D printing is disclosed. The composition for 3D printing can comprise a build material comprising at least one polymer and at least one first electron donor compound; and a fusing agent comprising (i) a metal bis(dithiolene) complex, (ii) at least one surfactant, at least one second electron donor compound, or combinations thereof, (iii) a polar aprotic solvent, and (iv) water. The at least one first electron donor compound and the at least one second electron donor compound are the same or different.

In some examples, a composition for 3D printing is disclosed. The composition for 3D printing can comprise a build material comprising at least one polymer and at least one first electron donor compound; and a fusing agent comprising (i) a metal bis(dithiolene) complex, (ii) at least one surfactant, at least one second electron donor compound, or combinations thereof, (iii) a polar aprotic solvent, and (iv) water, wherein the metal bis(dithiolene) complex has a general formula I

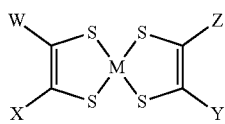

(I)

wherein: M is a metal selected from the group consisting of nickel, zinc, platinum, palladium, and molybdenum; and each of W, X, Y, and Z is selected from the group consisting of H, Ph, PhR, and SR, wherein Ph is a phenyl group and R is selected from the group consisting of $C_nH_{2n+1}$, $OC_nH_{2n+1}$, and $N(CH_3)_2$, wherein $2 \le n \le 12$, wherein the at least one first electron donor compound and the at least one second electron donor compound comprise hindered amine light stabilizer compounds, and wherein the surfactant is a thiol surfactant selected from the group consisting of dodecanethiol, 1-undecanethiol, 2-ethyihexanethiol, 1-octanethiol, 1-tetradecanethiol, and combinations thereof.

Electron Donor Compound(s)

The 3D printing composition described herein can comprise a build material which can include at least one first electron donor compound.

The 3D printing composition described herein can comprise a fusing agent which can include at least one second electron donor compound.

In some examples, the at least one first electron donor compound and the at least one second electron donor compound can be the same. In some examples, the at least one first electron donor compound and the at least one second electron donor compound can be different.

In some examples, the first and the second electron donor compound(s) can be the same or different and can comprise at least one hindered amine light stabilizer (HALS) compound, which can be the same or different.

The "HALS" term is a general term for compounds that can have a 2,2,6,6-tetramethylpiperidine skeleton and are broadly categorized according to molecular weight into low-molecular weight HALSs, medium-molecular weight HALSs, high-molecular weight HALSs and reactive HALSs.

Examples of HALS compounds can include TINUVIN® 111 FDL, TINUVIN® 123, TINUVIN® 144, TINUVIN® 292, TINUVIN® 765, TINUVIN® 770 (i.e., bis(2,2,6,6,-tetramethyl-4-piperidyl)sebacate), and mixtures thereof, all from BASF Corp.

Examples of HALS compounds can also include N,N'-bis(3-aminopropyl)ethylenediamine-2,4-bis[N-butyl-N-(1, 2,2,6,6-penta-methyl-4-pipeddyl)amino]-6-chloro-1,3,5-triazine condensate (CHIMASSORB® 119), CHIMASSORB® 2020, dimethyl succinate-1-(2-hydroxyethyl)-4-hydroxy-2,2,6,6-tetramethyl piperidine polycondensate (CHIMASSORB® 622LD), poly[{6-(1,1,3,3-tetramethyl-butyl)amino-1,3,5-triazine-2,4-diyl}{(2,2,6,-6-tetramethyl-4-piperidyl)imino}hexamethylene{(2,2,6,6-tetramethyllauryl-4-piperidyl)imino}](CHIMASSORB® 944FD), and mixtures thereof, all from BASF Corp.

Examples of HALS compounds can also include Sanduvor® 3050 Liq., Sanduvor® 3052 Liq., Sanduvor® 3058 Liq., Sanduvor® 3051 Powder, Sanduvor® 3070 Powder, VP Sanduvor® PR-31, HOSTAVIN® N20, HOSTAVIN® N24, HOSTAVIN® N30, HOSTAVIN® N321, HOSTAVIN® PR-31, HOSTAVIN® 845, NYLOSTAB® S-EED@, and mixtures thereof, all from Clariant (Japan) K.K.

In some examples, the first and the second electron donor compounds are TINUVIN® 770 (i.e., bis(2,2,6,6,-tetramethyl-4-piperidyl)sebacate).

As used herein, "first electron donor compound" and "second electron donor compound" can be referred to herein collectively as "electron donor compound(s)" for brevity.

In some examples, the electron donor compound(s) described herein can facilitate the reduction of the metal bis(dithiolene) complex in combination with a polar aprotic solvent described herein. Without wishing to be bound by theory, the electron donor compound can render the metal bis(dithiolene) complex readily reducible and thus more soluble in the polar aprotic solvent. Without the electron donor compound, the reduction of the metal bis(dithiolene) complex to its monoanionic form or to its dianionic form may involve the mixture of the neutral, non-reduced metal bis(dithiolene) complex and the polar aprotic solvent to be heated to an elevated temperature (e.g., a temperature ranging from about 50° C. to about 200° C.) for an extended time period (e.g., a time period ranging from about 5 hours to about 48 hours). However, when the electron donor compound is included in the mixture of the metal bis(dithiolene) complex and the polar aprotic solvent, the reduction of the metal bis(dithiolene) complex to its monoanionic form or to its dianionic form may be achieved at room temperature (e.g., from about 18° C. to about 25° C.) and within a few seconds (e.g., less than 10 seconds).

The electron donor compound(s) may also improve the jettability of the fusing agent by stabilizing the metal bis (dithiolene) complex. Without the electron donor compound(s), the metal bis(dithiolene) complex may precipitate out of solution when water or a liquid vehicle is added. When the electron donor compound(s) is included in the mixture of the metal bis(dithiolene) complex and the polar aprotic solvent, the reduced metal bis(dithiolene) complex can be easily formulated into (i.e., dissolved or dispersed rather than precipitated out of) a liquid vehicle.

The electron donor compound(s) can be present in the fusing agent in an amount sufficient to reduce and/or stabilize the metal bis(dithiolene) complex. In an example, the amount of the electron donor compound(s) in the fusing agent may range from about 1 wt % to about 10 wt % based on the total weight of the fusing agent. In an example, the amount of the electron donor compound(s) in the fusing agent may range from about 2 wt % to about 7 wt % based on the total weight of the fusing agent. In an example, the amount of the electron donor compound(s) in the fusing agent may range from about 3 wt % to about 5 wt % based on the total weight of the fusing agent. In an example, the amount of the electron donor compound(s) in the fusing agent may range from about 3 wt % to about 4 wt % based on the total weight of the fusing agent.

In some examples, in order to reduce oxidation of the polymer(s) in the build material, an electron donor compound can be added to, for example, scavenge free radicals (e.g., active alkyl and peroxy free radicals) that can be generated during the thermal processing of the polymer during 3D printing. During 3D printing, the polymer(s) in the build material can involve processing at high temperatures (e.g., over 100° C.) in the presence of oxygen, which can lead to oxidation of the polymer(s) in the build material. Reduction and in some examples elimination of the oxidative effects can, therefore, be beneficial and can be achieved by the use of low levels (e.g., about 0.05 wt %-about 10 wt % based on the total weight of the build material) of electron donor compound(s).

In some examples, degradation of the polymer(s) during thermal processing can proceed through an auto-oxidative free radical chain reaction process shown in schemes A)-D) below. This auto-oxidative process can involves the generation of free radicals (Scheme A)), propagation reactions which can lead to the formation of hydroperoxides (Scheme B)), chain branching (Scheme C)), and termination reaction in which free radicals are reduced and/or eliminated from the auto-oxidized polymer(s) (Scheme D)).

A) Chain initiation $$PH \xrightarrow{\Delta} P^* + H^*$$

$$PH + O_2 \xrightarrow{\Delta} P^* + H^*$$

$$\text{catalyst residues} \xrightarrow{\Delta} \text{free radicals}$$

B) Chain propagation $$P^* + O_2 \longrightarrow PO_2^*$$

$$PO_2^* + PH \longrightarrow POOH + P^*$$

C) Chain branching $$POOH \xrightarrow{\Delta} PO^* + HO^*$$

$$POOH + PH \xrightarrow{\Delta} PO^* + P^* + H_2O$$

$$2POOH \xrightarrow{\Delta} PO^* + PO_2^* + H_2O$$

$$PO^* + PH \longrightarrow POH + P^*$$

$$HO^* + PH \longrightarrow H_2O + P^*$$

D) Chain termination $$PO_2^* + PO_2^* \longrightarrow POOP + O_2$$

$$PO_2^* + PO_2^* \longrightarrow PO^* + PO^* + O_2$$

$$PO_2^* + PO_2^* \longrightarrow \text{inactive products} + O_2$$

$$P^* + PO_2^* \longrightarrow POOP$$

$$P^* + P^* \longrightarrow P\!\!-\!\!P$$

Without wishing to be bound by theory, it is believed that formation of hydroperoxides and their decomposition products of the polymer(s) in the build materials can alter the molecular structure of the polymer(s) and the overall molar mass of the polymer(s). These alterations can negatively impact the mechanical properties of the polymer(s) in the build material. The alterations can also impact the physical properties of the polymer surface (e.g., reduced transparency, increased cracking, and increased yellowing). Reduction and/or inhibition of these oxidative effects are, therefore, a goal and can be achieved by the use of at least one electron donor compound.

In an example, an electron donor compound like bis(2,2,6,6,-tetramethyl-4-piperidyl)sebacate ("AH" shown in Scheme E below) can be an electron or hydrogen atom donor, which can reduce POO. to POOH (see Scheme E below).

$$AH + POO. \rightarrow POOH + A. \tag{E}$$

In some examples, the electron donor compound(s) can be present in the build material in an amount sufficient to reduce the polymer(s) in the build material. In an example, the amount of the electron donor compound(s) in the build material may range from about 0.05 wt % to about 10 wt % based on the total weight of the build material. In an example, the amount of the electron donor compound(s) in the build material may range from about 0.1 wt % to about 5 wt % based on the total weight of the build material. In an example, the amount of the electron donor compound(s) in the build material may range from about 0.5 wt % to about 4 wt % based on the total weight of the build material. In an example, the amount of the electron donor compound(s) in the build material may range from about 1 wt % to about 3 wt % based on the total weight of the build material. In an example, the amount of the electron donor compound(s) in the build material may be less than about 5 wt % based on the total weight of the build material. In an example, the amount of the electron donor compound(s) in the build material may be less than about 4 wt % based on the total weight of the build material. In an example, the amount of the electron donor compound(s) in the build material may be less than about 3 wt % based on the total weight of the build material.

In some examples, the at least one first electron donor compound can be present in the build material in an amount ranging from about 0.1 wt % to about 3 wt % based on the total weight of the build material; and the at least one second electron donor compound can be present in the fusing agent in an amount ranging from about 1 wt % to about 10 wt % based on the total weight of the fusing agent.

Metal Bis(Dithiolene) Complex(es)

In some examples, the fusing agent can include a metal bis(dithiolene) complex, which can absorb light having wavelengths ranging from about 600 nm to about 1600 nm. The metal bis(dithiolene) complex, and the fusing agent including the complex, is capable of absorbing at least about 80% of radiation having wavelengths ranging from about 600 nm to about 1600 nm.

The absorption maximum of the metal bis(dithiolene) complex may undergo a bathochromic shift (e.g., further into the near-infrared region toward the medium infrared region) or a hypsochromic shift (e.g., in the near-infrared region toward the visible region) depending upon the chemistry of the complex and/or fusing agent. As examples, the shift may depend upon a polar aprotic solvent present in the fusing agent and/or upon the nature of the functional group(s) attached to the complex. Like the visible region absorbing fusing agents, the absorption of the fusing agents including the metal bis(dithiolene) complex generates heat suitable for fusing polymeric or polymeric composite build material in contact therewith during 3D printing, which leads to 3D parts having mechanical integrity and relatively uniform mechanical properties (e.g., strength or elongation at break).

The metal bis(dithiolene) complex allows the fusing agent to absorb radiation at wavelengths ranging from 600 nm to 1600 nm, which enables the fusing agent to convert enough radiation to thermal energy so that the polymeric or polymeric composite build material particles in contact with the fusing agent fuse.

Examples of the metal bis(dithiolene) complex can include a metal bis(dithiolene) complex having a general formula I:

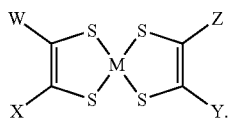

(I)

Examples of M include nickel, zinc, platinum, palladium, and molybdenum. Examples of each of W, X, Y, and Z include a hydrogen (H), a phenyl group (Ph), a phenyl group bonded to an R group (i.e., PhR), wherein R is $C_nH_{2n+1}$, or $OC_nH_{2n+1}$, or $N(CH_3)_2$, and a sulfur bonded to an R group (i.e., SR), wherein R is $C_nH_{2n+1}$, or $OC_nH_{2n+1}$, or $N(CH_3)_2$. In these examples, n may be greater than or equal to 2 and less than or equal to 12 (i.e., $2 \leq n \leq 12$).

When the metal bis(dithiolene) complex has the general formula I shown above, the strong NIR absorption of the metal bis(dithiolene) complex may be the result of the electron delocalization about the dithiolene ring and the interaction of the delocalized electrons with the empty d-orbitals of the metal center.

The amount of the metal bis(dithiolene) complex in the fusing agent may range from about 1 wt % to about 10 wt % based on the total weight of the fusing agent. In an example, the amount of the metal bis(dithiolene) complex present in the fusing agent is from about 1 wt % to about 7 wt % based on the total weight of the fusing agent. In an example, the amount of the metal bis(dithiolene) complex present in the fusing agent is from about 2 wt % to about 5 wt % based on the total weight of the fusing agent. In an example, the amount of the metal bis(dithiolene) complex present in the fusing agent is less than about 5 wt % based on the total weight of the fusing agent. In an example, the amount of the metal bis(dithiolene) complex present in the fusing agent is less than about 4 wt % based on the total weight of the fusing agent. In an example, the amount of the metal bis(dithiolene) complex present in the fusing agent is less than about 3 wt % based on the total weight of the fusing agent.

In some examples, the metal bis(dithiolene) complex can be present in the fusing agent in an amount ranging from about 1 wt % to about 10 wt % based on the total weight of the fusing agent.

These metal bis(dithiolene) complex loadings can generate a balance between the fusing agent having jetting reliability and electromagnetic radiation absorbance efficiency.

In some examples, a polar aprotic solvent may be included in the fusing agent to at least partially dissolve and reduce the metal bis(dithiolene) complex and to shift the absorption of the metal bis(dithiolene) complex. In some instances, the shift can be further into the near-infrared (NIR) region (e.g., shifting from an absorption maximum of about 850 nm when the metal bis(dithiolene) complex is not reduced to an absorption maximum of about 940 nm when metal bis(dithiolene) complex is reduced (e.g., to its monoanionic form or to its dianionic form)). The electron donor compound can shift the absorption maximum of the metal bis(dithiolene) complex by reducing the metal bis(dithiolene) complex to its monoanionic form or to its dianionic form according to equation II shown below:

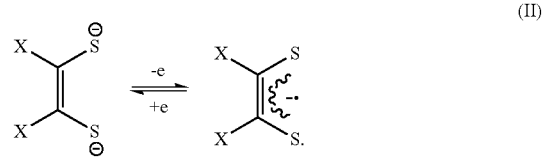

(II)

When the metal bis(dithiolene) complex is reduced to its monoanionic form or to its dianionic form, the color of the metal bis(dithiolene) complex can change. For example, the initial reduction of a nickel bis(dithiolene) complex to its monoanionic form may result in the color changing from green to reddish brown. For example, the further reduction of a nickel bis(dithiolene) complex to its dianionic form may result in the color changing to become substantially colorless. Other color changes may be observed with different metals in the complex. As noted above, the color changed complex can still absorb infrared radiation.

Surfactant(s)

The 3D printing composition(s) described herein can include a fusing agent which can include at least one surfactant. In some examples, this at least one surfactant can include a thiol surfactant.

The thiol surfactant may be included in the fusing agent to stabilize the metal bis(dithiolene) complex. In particular, the thiol surfactant may render the complex more soluble in a vehicle of the fusing agent, thus reducing its tendency to precipitate out of the vehicle. Stabilizing the metal bis(dithiolene) complex with the thiol surfactant may also facilitate the reduction of the metal bis(dithiolene) complex by the polar aprotic solvent (i.e., may enable the reduction to occur at room temperature and within a few seconds) and/or improve the jettability of the fusing agent.

As also mentioned above, the thiol surfactant may be included in the fusing agent to stabilize the metal bis (dithiolene) complex. The thiol surfactant may facilitate the reduction of the metal bis(dithiolene) complex by the polar aprotic solvent. More specifically, the thiol surfactant may render the complex readily reducible and thus more soluble in the polar aprotic solvent. Without the thiol surfactant, the reduction of the metal bis(dithiolene) complex to its monoanionic form or to its dianionic form may entail the mixture of the neutral, non-reduced metal bis(dithiolene) complex and the polar aprotic solvent to be heated to an elevated temperature (e.g., a temperature ranging from about 50° C. to about 200° C.) for an extended time period (e.g., a time period ranging from about 5 hours to about 48 hours). When the thiol surfactant is included in the mixture of the metal bis(dithiolene) complex and the polar aprotic solvent, the reduction of the metal bis(dithiolene) complex to its monoanionic form or to its dianionic form may be accomplished at room temperature (e.g., from about 18° C. to about 25° C.) and within a few seconds (e.g., less than 10 seconds).

The thiol surfactant may also improve the jettability of the fusing agent by stabilizing the metal bis(dithiolene) complex. Without the thiol surfactant, the metal bis(dithiolene) complex may precipitate out of solution when water or a liquid vehicle is added. When the thiol surfactant is included in the mixture of the metal bis(dithiolene) complex and the polar aprotic solvent, the reduced metal bis(dithiolene) complex can be easily formulated into (i.e., dissolved or dispersed rather than precipitated out of) a liquid vehicle.

An example of the thiol surfactant can be dodecanethiol, 1-undecanethiol, 2-ethyihexanethiol, 1-octanethiol, 1-tetradecanethiol, or combinations thereof.

The thiol surfactant can be present in the fusing agent in an amount sufficient to stabilize the metal bis(dithiolene) complex. In an example, the amount of the thiol surfactant in the fusing agent may range from about 1 wt % to about 5 wt % based on the total weight of the fusing agent.

In some examples, the 3D printing composition(s) described herein can include a fusing agent which can include at least one surfactant. In some examples, this at least one surfactant can include a thiol surfactant. The thiol surfactant can be used as a wetting agent and/or as a surface tension reducing agent. In some examples, in addition to the thiol surfactant or in some examples, as an alternative to the thiol surfactant, other surfactant(s) can be added to the fusing agent.

In some examples, no thiol surfactant is added to the fusing agent and instead other surfactant(s) can be added.

In some examples, the other surfactants can include wetting agent(s) and/or surface tension reducing agent(s).

Examples of suitable wetting agents can include non-ionic surfactants. Some specific examples include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants from DuPont, previously referred as ZONYL FSO), and combinations thereof. In other examples, the wetting agent is an ethoxylated lowfoam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable wetting agents include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15S7, and TERGITOL™ 15S9 from The Dow Chemical Company). In some examples, an anionic surfactant may be used in combination with the non-ionic surfactant. In some examples, it may be appropriate to utilize a wetting agent having a hydrophilic-lipophilic balance (HLB) less than 10.

The wetting agent(s) may be present in the fusing agent in an amount ranging from about 0.1 wt % to about 4 wt % of the total weight of the fusing agent. In an example, the amount of the wetting agent(s) present in the fusing agent is about 0.1 wt % (based on the total weight of the fusing agent). In another example, the amount of the wetting agent(s) present in the fusing agent is about 0.04 wt % (based on the total weight of the fusing agent).

The liquid vehicle may also include surface tension reduction agent(s). Any of the previously mentioned wetting agents/surfactants may be used to reduce the surface tension. As an example, the surface tension reduction agent may be the self-emulsifiable, non-ionic wetting agent based on acetylenic diol chemistry (e.g., SURFYNOL® SEF from Air Products and Chemicals, Inc.).

When a surfactant is both a wetting agent and a surface tension reduction agent, any of the ranges presented herein for the wetting agent and the surface tension reduction agent may be used for the surfactant.

The surface tension reduction agent(s) may be present in the fusing agent in an amount ranging from about 0.1 wt % to about 4 wt % of the total weight of the fusing agent. In an example, the amount of the surface tension reduction agent(s) present in the fusing agent is about 1.5 wt % (based on the total weight of the fusing agent). In another example, the amount of the surface tension reduction agent(s) present in the fusing agent is about 0.6 wt % (based on the total weight of the fusing agent).

When a surfactant is both a wetting agent and a surface tension reduction agent, any of the ranges presented herein for the wetting agent and the surface tension reduction agent may be used for the surfactant.

Polar Aprotic Solvent(s)

In some examples, the polar aprotic solvent can include 1-methyl-2-pyrrolidone (1M2P), 2-pyrrolidone, 1-(2-hydroxyethyl)-2-pyrrolidone, dimethylformamide (DMF), dimethyl sulfoxide (DMSO), and combinations thereof.

In some examples, the polar aprotic solvent is 2-pyrrolidone.

The polar aprotic solvent can be present in the fusing agent in an amount sufficient to reduce the metal bis(dithiolene) complex to its monoanionic form or to its dianionic form. In an example, the amount of the polar aprotic solvent in the fusing agent may range from about 5 wt % to about 70 wt % based on the total weight of the fusing agent. In an example, the amount of the polar aprotic solvent in the fusing agent may range from about 15 wt % to about 60 wt % based on the total weight of the fusing agent. In an example, the amount of the polar aprotic solvent in the fusing agent may range from about 25 wt % to about 50 wt % based on the total weight of the fusing agent. In an example, the amount of the polar aprotic solvent in the fusing agent may range from about 35 wt % to about 45 wt % based on the total weight of the fusing agent. In another example, the amount of the polar aprotic solvent present in the fusing agent is about 40 wt % based on the total weight of the fusing agent. In still another example, the amount of the polar aprotic solvent present in the fusing agent is about 50 wt % based on the total weight of the fusing agent.

In some examples, the polar aprotic solvent can be present in the fusing agent in an amount ranging from about 5 wt % to about 50 wt % based on the total weight of the fusing agent.

Liquid Vehicle & Additive(s)

The fusing agent disclosed herein can include a liquid vehicle. Liquid vehicle(s), as described herein, can include the aprotic solvent(s) described hereinabove and solvent(s) other than the aprotic solvent(s) described hereinabove. The liquid vehicle(s), as described herein, can generally include solvent(s) in which the metal bis(dithiolene) complex is placed to form the fusing agent.

Examples of liquid vehicles can include water, alone or in combination with a mixture of a variety of additional components. Examples of these additional components may include water soluble co-solvent(s), wetting agent(s), surface tension reduction agent(s), emulsifier(s), scale inhibitor(s), anti-deceleration agent(s), chelating agent(s), and/or antimicrobial agent(s).

In some examples, the liquid vehicle can be present in the fusing agent in an amount of from about 1 wt % to about 80 wt % based on the total weight of the fusing agent. In some examples, the liquid vehicle can be present in the fusing agent in an amount of from about 5 wt % to about 70 wt % based on the total weight of the fusing agent. In some examples, the liquid vehicle can be present in the fusing agent in an amount of from about 10 wt % to about 60 wt % based on the total weight of the fusing agent. In some examples, the liquid vehicle can be present in the fusing agent in an amount of from about 20 wt % to about 50 wt % based on the total weight of the fusing agent. In some examples, the liquid vehicle can be present in the fusing agent in an amount of from about 50 wt % to about 95 wt % based on the total weight of the fusing agent. In some examples, the liquid vehicle can be present in the fusing agent in an amount of from about 60 wt % to about 85 wt % based on the total weight of the fusing agent.

The co-solvent can be present in the liquid vehicle in an amount ranging from about 0.1 wt % to about 20 wt % based on the total weight of the liquid vehicle.

Some examples of co-solvents can include 2-pyrrolidinone, hydroxyethyl-2-pyrrolidone, diethylene glycol, 2-methyl-1,3-propanediol, tetraethylene glycol, tripropylene glycol methyl ether, dipropylene glycol methyl ether, tripropylene glycol butyl ether, dipropylene glycol butyl ether, triethylene glycol butyl ether, 1,2-hexanediol, 2-hydroxyethyl pyrrolidinone, 2-hydroxyethyl-2-pyrrolidinone, 1,6-hexanediol, and combinations thereof.

One example liquid vehicle includes water, the polar aprotic solvent, and the electron donor compound(s). Another example liquid vehicle consists of water, the polar aprotic solvent, and the electron donor compound(s) (without any other components).

The water in the liquid vehicle may prevent (further) reduction of the metal bis(dithiolene) complex until the water is driven off as a result of the build material platform temperature and/or the temperature achieved during radiation exposure. After the water is driven off, the metal bis(dithiolene) complex is capable of being further reduced and becoming colorless/discolored, which enables the 3D part to exhibit a color of the build material (e.g., white or off-white) or to exhibit a color of a colorant present in the fusing agent.

The aqueous nature of the fusing agent can enable the fusing agent to penetrate, at least partially, into the layer of the polymeric or polymeric composite build material particles. The build material particles may be hydrophobic, and the presence of the wetting agent(s) in the fusing agent may assist in obtaining a particular wetting behavior.

The balance of the fusing agent is water. As such, the amount of water may vary depending upon the amounts of the metal bis(dithiolene) complex, the electron donor compound, the polar aprotic solvent, any colorant(s), any dispersant(s), any co-solvent(s), and in some instances antikogation agent(s), the additive dispersant(s), the acrylic latex binder(s), and/or the biocide(s) that can be included.

In some examples, water can be present in the fusing agent(s) in amounts greater than about 30 wt % based on the total weight of the fusing agent(s). In some examples, the water can be present in the fusing agent(s) in amounts from about 40 wt % to about 90 wt % based on the total weight of the fusing agent(s). In other examples, the fusing agent(s) can include from about 45 wt % to about 80 wt % water. In further examples, the fusing agent(s) can include from about 50 wt % to about 70 wt % water.

The liquid vehicle may also include water soluble organic solvent(s). In some examples, the water soluble organic solvent(s) may be the same type of solvent as the polar aprotic solvent. In these examples, the water soluble organic solvent(s) may be 1-methyl-2-pyrrolidone (1M2P), 2-pyrrolidone, 1-(2-hydroxyethyl)-2-pyrrolidone, dimethylformamide (DMF), dimethyl sulfoxide (DMSO), or a combination thereof. In other examples, the water soluble organic solvent(s) may be different than the polar aprotic solvent. For example, two different polar aprotic solvents may be selected. For another example, the water soluble organic solvent(s) may be 1,5-pentanediol, triethylene glycol, tetraethylene glycol, 2-methyl-1,3-propanediol, 1,6-hexanediol, tripropylene glycol methyl ether, or a combination thereof.

The water soluble organic solvent(s) may be present in the fusing agent in an amount ranging from about 2 wt % to about 80 wt % of the total weight of the fusing agent. In an example, the amount of the water soluble organic solvent(s) present in the fusing agent is about 40 wt % (based on the total weight of the fusing agent). In another example, the amount of the water soluble organic solvent(s) present in the fusing agent is about 16 wt % (based on the total weight of the fusing agent).

The liquid vehicle may also include emulsifier(s). Examples of suitable emulsifiers include oleth-3-phosphate (commercially available as CRODAFOS™ O3A or CRODAFOS™ N-3 acid) or dextran 500 k. Other suitable examples of the emulsifiers include CRODAFOS™ HCE (phosphate-ester from Croda Int.), CRODAFOS® N10 (oleth-10-phosphate from Croda Int.).

The emulsifier(s) may be present in the fusing agent in an amount ranging from about 0.1 wt % to about 2 wt % of the total weight of the fusing agent. In an example, the amount of the emulsifier(s) present in the fusing agent is about 1 wt % (based on the total weight of the fusing agent). In another example, the amount of the emulsifier(s) present in the fusing agent is about 0.4 wt % (based on the total weight of the fusing agent).

The fusing agent may include scale inhibitor(s) or anti-deceleration agent(s). One suitable scale inhibitor/anti-deceleration agent is an alkyldiphenyloxide disulfonate (e.g., DOWFAX™ 8390 and DOWFAX™ 2A1 from The Dow Chemical Company).

The scale inhibitor(s)/anti-deceleration agent(s) may be present in the fusing agent in an amount ranging from about 0.05 wt % to about 5 wt % of the total weight of the fusing agent. In an example, the scale inhibitor(s)/anti-deceleration agent(s) is/are present in the fusing agent in an amount of about 0.25 wt % (based on the total weight of the fusing agent). In another example, the scale inhibitor(s)/anti-deceleration agent(s) is/are present in the fusing agent in an amount of about 0.1 wt % (based on the total weight of the fusing agent).

The fusing agent may also include chelating agent(s). The chelating agent may be included to eliminate the deleterious effects of heavy metal impurities. Examples of suitable chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent may range from 0 wt % to about 2 wt % based on the total weight of the fusing agent. In an example, the chelating agent is present in the fusing agent in an amount of about 0.08 wt % (based on the total weight of the fusing agent). In another example, the chelating agent is present in the fusing agent in an amount of about 0.032 wt % (based on the total weight of the fusing agent).

The liquid vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, ACTICIDE® M20 (Thor), and combinations thereof.

In an example, the fusing agent may include a total amount of antimicrobial agents that ranges from about 0.1 wt % to about 0.35 wt %. In an example, the antimicrobial agent is a biocide and is present in the fusing agent in an amount of about 0.32 wt % (based on the total weight of the fusing agent). In another example, the antimicrobial agent is a biocide and is present in the fusing agent in an amount of about 0.128 wt % (based on the total weight of the fusing agent).

Colorant(s)

In some examples, the fusing agent may further include a colorant. The colorant can be present in the fusing agent in addition to the metal bis(dithiolene) complex. While the metal bis(dithiolene) complex functions as an electromagnetic radiation absorber and becomes colorless after fusing the build material, the additional colorant may impart color to the fusing agent and the resulting 3D part.

The colorant may be a pigment and/or dye having any suitable color. Examples of the colors include cyan, magenta, yellow, or combinations thereof. Examples of colorants include dyes, such as Acid Yellow 23 (AY 23), Acid Yellow 17 (AY 17), Acid Red 52 (AR 52), Acid Red 289 (AR 289), Reactive Red 180 (RR 180), Direct Blue 199 (DB 199), or pigments, such as Pigment Blue 15:3 (PB 15:3), Pigment Red 122 (PR 122), Pigment Yellow 155 (PY 155), and Pigment Yellow 74 (PY 74).

Any standard color pigments may be used, such as phthalocyanines for blue, quinacridone for magenta or red, pigment yellow for yellow, white, black, or combinations thereof. Some commercially available examples of the white colorant are available from DuPont under the tradename TI-PURE®, an example of which includes TI-PURE® R-706.

In some examples, dyes can be used. Examples include acid dyes (e.g., Acid Red 52, Acid Red 289, Acid Yellow 23, Acid Yellow 17, or combinations thereof), reactive dyes (e.g., Reactive Red 180, Reactive Black 31, or combinations thereof), and phthalocyanine dyes (e.g., Direct Blue 199 and Pro-Jet Cyan dyes available from Fujifilm Industrial Colorants).

Some examples of the colorant(s) can include a set of cyan, magenta, and yellow inks, such as C1893A (cyan), C1984A (magenta), and C1985A (yellow); or C4801A (cyan), C4802A (magenta), and C4803A (yellow); all of which are available from Hewlett-Packard Company.

In some other examples, the fusing agent excludes a colorant other than the metal bis(dithiolene) complex. It may be appropriate to exclude the colorant from the fusing agent when the 3D part to be created is to be the color of the polymeric or polymeric composite build material (e.g., white or off-white) or when a colored ink will be applied to the 3D part.

In some examples, a colored ink can include a colorant, a solvent, a surfactant, and water. In some examples, the fusing agent described herein can further include a colorant.

In some examples, the colored ink(s) can include a pigment, which imparts color to the build material upon application. The pigment may be a self-dispersing pigment or the soft polymer precursor may act as a suitable dispersant for dispersing the pigment throughout the composition. In some examples, the colored ink(s) can include a colorant (e.g., pigment and/or dye) having a color including white or black. Examples of colors include cyan, magenta, yellow, white, black, or mixtures thereof.

The amount of the colorant that may be present in the fusing agent ranges from about 0.1 wt % to about 20 wt % based on the total weight of the fusing agent. In some examples, the amount of the colorant that may be present in the fusing agent ranges from about 1 wt % to about 15 wt % based on the total weight of the fusing agent. In some examples, the amount of the colorant that may be present in the fusing agent ranges from about 1 wt % to about 10 wt % based on the total weight of the fusing agent.

Build Material(s)

The 3D printing composition described herein can comprise a build material which can include at least one first electron donor compound.

As used herein, "first electron donor compound" and "second electron donor compound" can be referred to herein collectively as "electron donor compound(s)" for brevity.

In some examples, the electron donor compound(s) can comprise at least one hindered amine light stabilizer (HALS) compound. Examples of HALS compounds can include TINUVIN® 111 FDL, TINUVIN® 123, TINUVIN® 144, TINUVIN® 292, TINUVIN® 765, TINUVIN® 770 (i.e., bis(2,2,6,6,-tetramethyl-4-piperidyl)sebacate), and mixtures thereof, all from BASF Corp. Examples of HALS compounds can also include N,N'-bis(3-aminopropyl)ethylenediamine-2,4-bis[N-butyl-N-(1,2,2,6,6-penta-methyl-4-piperidyl)amino]-6-chloro-1,3,5-triazine condensate (CHIMASSORB® 119), CHIMASSORB® 2020, dimethyl succinate-1-(2-hydroxyethyl)-4-hydroxy-2,2,6,6-tetramethyl piperidine polycondensate (CHIMASSORB® 622LD), poly[{6-(1,1,3,3-tetramethyl-butyl)amino-1,3,5-triazine-2,4-diyl}{(2,2,6,-6-tetramethyl-4-piperidyl)imino}hexamethylene{(2,2,6,6-tetramethyllauryl-4-piperidyl)imino}] (CHIMASSORB® 944FD), and mixtures thereof, all from BASF Corp. Examples of HALS compounds can also include Sanduvor® 3050 Liq., Sanduvor® 3052 Liq., Sanduvor® 3058 Liq., Sanduvor® 3051 Powder, Sanduvor® 3070 Powder, VP Sanduvor® PR-31, HOSTAVIN® N20, HOSTAVIN® N24, HOSTAVIN® N30, HOSTAVIN® N321, HOSTAVIN® PR-31, HOSTAVIN® 845, NYLOSTAB® S-EED®, and mixtures thereof, all from Clariant (Japan) K.K.

In some examples, the electron donor compound is TINUVIN® 770 (i.e., bis(2,2,6,6,-tetramethyl-4-piperidyl)sebacate).

In some examples, in order to reduce oxidation of the polymer(s) in the build material, an electron donor compound can be added to, for example, scavenge free radicals (e.g., active alkyl and peroxy free radicals) that can be generated during the thermal processing of the polymer during 3D printing. During 3D printing, the polymer(s) in the build material can involve processing at high temperatures (e.g., over 100° C.) in the presence of oxygen, which can lead to oxidation of the polymer(s) in the build material. Reduction and in some examples elimination of the oxidative effects can, therefore, be beneficial and can be achieved by the use of low levels (e.g., about 0.05 wt %-about 10 wt % based on the total weight of the build material) of electron donor compound(s).

The electron donor compound(s) can be present in the build material in an amount sufficient to reduce the polymer(s) in the build material. In an example, the amount of the electron donor compound(s) in the build material may range from about 0.05 wt % to about 10 wt % based on the total weight of the build material. In an example, the amount of the electron donor compound(s) in the build material may range from about 0.1 wt % to about 5 wt % based on the total weight of the build material. In an example, the amount of the electron donor compound(s) in the build material may range from about 0.5 wt % to about 4 wt % based on the total weight of the build material. In an example, the amount of the electron donor compound(s) in the build material may range from about 1 wt % to about 3 wt % based on the total weight of the build material. In an example, the amount of the electron donor compound(s) in the build material may be less than about 5 wt % based on the total weight of the build material. In an example, the amount of the electron donor compound(s) in the build material may be less than about 4 wt % based on the total weight of the build material. In an example, the amount of the electron donor compound(s) in the build material may be less than about 3 wt % based on the total weight of the build material.

In some examples, the at least one first electron donor compound can be present in the build material in an amount ranging from about 0.1 wt % to about 3 wt % based on the total weight of the build material; and the at least one second electron donor compound can be present in the fusing agent in an amount ranging from about 1 wt % to about 10 wt % based on the total weight of the fusing agent.

The build material can comprise at least one polymer, which can be a powder, a liquid, a paste, or a gel. Examples of polymer(s) can include semi-crystalline thermoplastic materials with a wide processing window of greater than 5° C. (e.g., the temperature range between the melting point and the re-crystallization temperature). Some specific examples of the polymer(s) can include polyamides (PAs) (e.g., PA 11/nylon 11, PA 12/nylon 12, PA 6/nylon 6, PA 8/nylon 8, PA 9/nylon 9, PA 6,6/nylon 6,6, PA 612/nylon 6,12, PA 8,12/nylon 8,12, PA 9,12/nylon 9,12, or combinations thereof). Other specific examples of the polymer(s) can include polyethylene, polyethylene terephthalate (PET), and an amorphous variation of these materials. Still other examples of suitable build materials can include polystyrene, polyacetals, polypropylene, polycarbonate, polyester, thermal polyurethanes, other engineering plastics, and blends of any two or more of the polymers listed herein. Core shell polymer particles of these materials may also be used.

The polymer(s) can have a melting point ranging from about 50° C. to about 400° C. As examples, the polymer(s) may be a polyamide having a melting point of 180° C., or thermal polyurethanes having a melting point ranging from about 100° C. to about 185° C.

The polymer(s) can be made up of similarly sized particles or differently sized particles. In some examples, the polymer(s) can include particles of two different sizes. The term "size," as used herein with regard to the build material, refers to the diameter of a spherical particle, or the average diameter of a non-spherical particle (e.g., the average of multiple diameters across the particle).

In an example, the average size of the polymer(s) particles can range from about 0.1 µm to about 100 µm, or from about 1 µm to about 80 µm, or from about 5 µm to about 50 µm.

Build Material Additive(s)

In some examples, the build material can include, in addition to at least one polymer and at least one first electron donor compound, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.).

In an example, the charging agent can be added in an amount ranging from greater than about 0 wt % to less than about 5 wt % based upon the total weight of the build material.

Flow aid(s) can be added to improve the coating flowability of the build material. Flow aid(s) may be particularly beneficial when the polymer(s) particles are less than about 25 µm in size. The flow aid can improve the flowability of the polymer(s) by reducing the friction, the lateral drag, and the tribocharge buildup (by increasing the particle conductivity). Examples of flow aids can include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900).

In an example, the flow aid can be added in an amount ranging from greater than about 0 wt % to less than about 5 wt % based upon the total weight of the build material.

Jetting Method(s)

In some examples, layer(s) of the build material comprising at least one polymer and at least one first electron donor compound can be applied in a fabrication bed of a 3D printer. The applied layer(s) can be exposed to heating, which can be performed to pre-heat the build material. Thus, the heating temperature may be below the melting point of the build material. As such, the temperature selected can depend upon the build material that is used. As examples, the heating temperature may be from about 5° C. to about 50° C. below the melting point of the build material. In an example, the heating temperature can range from about 50°

C. to about 400° C. In another example, the heating temperature can range from about 150° C. to about 170° C.

Pre-heating the layer(s) of the build material may be accomplished using any suitable heat source that exposes all of the build material to the heat. Examples of the heat source can include a thermal heat source or an electromagnetic radiation source (e.g., infrared (IR), microwave, or combination thereof).

After pre-heating the layer(s) of the build material, the fusing agent herein can be selectively applied on at least a portion of the build material in the layer(s).

The fusing agent described herein can be dispensed from an inkjet printhead, such as a thermal inkjet printhead or a piezoelectric inkjet printhead. The printhead can be a drop-on-demand printhead or a continuous drop printhead.

The printhead may include an array of nozzles through which drops of the fusing agent described herein can be ejected. In some examples, printhead can deliver variable size drops of the fusing agent.

Before or after selectively applying the fusing agent described herein on the portion(s) of the build material, colored ink(s) can be applied to portion(s) of the build material.

After the fusing agent and in some instances the colored ink(s) are selectively applied in the specific portions of the layer(s) of the build material, the entire object(s) or part(s) is exposed to infrared radiation.

The infrared radiation can be emitted from a radiation source, such as an IR (e.g., near-IR) curing lamp, or IR (e.g., near-IR) light emitting diodes (LED), or lasers with specific IR or near-IR wavelengths. Any radiation source may be used that emits a wavelength in the infrared spectrum, for example near-infrared spectrum. The radiation source may be attached, for example, to a carriage that also holds the printhead(s). The carriage may move the radiation source into a position that is adjacent to the fabrication bed containing the 3D printed object(s) or part(s). The radiation source may be programmed to receive commands from a central processing unit and to expose the layer(s) of the build material including the fusing agent to the infrared radiation.

The length of time the radiation is applied for, or energy exposure time, may be dependent, for example, on characteristics of the radiation source, characteristics of the build material, and/or characteristics of the fusing agent(s).

The fusing agent described herein can enhance the absorption of the radiation, convert the absorbed radiation to thermal energy, and promote the transfer of the thermal heat to the build material in contact therewith. In an example, the fusing agent can sufficiently elevate the temperature of the build material above the melting point(s), allowing curing (e.g., sintering, binding, or fusing) of the build material particles to take place.

In some examples, portions of the build material that do not have the fusing agent applied thereto do not absorb enough energy to fuse. However, the generated thermal energy may propagate into the surrounding build material that does not have the fusing agent applied thereto. The propagation of thermal energy may cause at least some of the build material sans fusing agent to partially fuse.

Exposure to radiation can complete the formation of the 3D printed object(s) or part(s).

In some examples, the completed 3D printed object(s) or part(s) may be removed from the fabrication bed and any uncured build material may be removed from the 3D part(s) or object(s).

In some examples, the uncured build material may be washed and then reused.

Method(s) of Using 3D Printing Composition(s)

In some examples, a method of using a 3D printing composition can be described. The method of using the 3D printing composition can comprise depositing the composition on a substrate during 3D printing.

In some examples, the depositing of the composition on a substrate can comprise jetting layer(s) of the build material onto a fabrication bed of a 3D printer. In some examples, the substrate can be a fabrication bed.

Method(s) of Making Fusing Agent(s)

Also disclosed herein is a method of making the fusing agent. In some examples, the fusing agent can be made by a method comprising: exposing a metal bis(dithiolene) complex to a solution comprising at least one second electron donor compound, a polar aprotic solvent, and water, and forming a reduced metal bis(dithiolene) complex in the solution. The metal bis(dithiolene) complex has a general formula I:

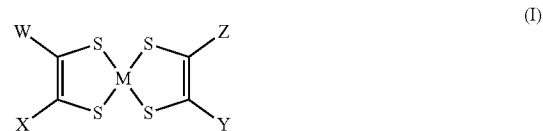

(I)

wherein: M is a metal selected from the group consisting of nickel, zinc, platinum, palladium, and molybdenum; and each of W, X, Y, and Z is selected from the group consisting of H, Ph, PhR, and SR, wherein Ph is a phenyl group and R is selected from the group consisting of $C_nH_{2n+1}$, $OC_nH_{2n+1}$, and $N(CH_3)_2$, wherein $2 \leq n \leq 12$.

In the method described hereinabove, the at least one second electron donor compound can be the same as or different from the at least one first electron donor compound added to the build material. The at least one second electron donor compound can comprise at least one hindered amine light stabilizer compound. In the method described hereinabove, the polar aprotic solvent can be any polar aprotic solvent described above.

In some examples, the fusing agent may be prepared by exposing the metal bis(dithiolene) complex (I) to a solution including an electron donor compound and a polar aprotic solvent, thereby forming a reduced metal bis(dithiolene) complex and dissolving the reduced metal bis(dithiolene) complex in the solution. In some instances, this solution may also include water. The metal bis(dithiolene) complex (I) may be reduced to its monoanionic form or to its dianionic form by the reducing agent in the solution. The reduced metal bis(dithiolene) complex (I) may then dissolve in the solution.

An example of the method can further include incorporating the solution into a liquid vehicle including a water soluble co-solvent and an additive selected from the group consisting of an emulsifier, a surface tension reduction agent, a wetting agent, a scale inhibitor, an anti-deceleration agent, a chelating agent, an antimicrobial agent, and a combination thereof.

In some examples, the metal bis(dithiolene) complex is exposed to the solution at room temperature (e.g., a temperature ranging from about 18° C. to about 25° C. The metal bis(dithiolene) complex may be reduced and dissolved in the solution within few seconds (e.g., less than 10 seconds).

The adding of the metal bis(dithiolene) complex to a solution including an electron donor compound, a polar aprotic solvent, and water can include mixing, grinding, milling, and combinations thereof to form a substantially homogeneous mixture of the metal bis(dithiolene) complex in the fusing agent.

3D Printing Using Fusing Agent(s)

In some examples, a method of building a 3D printed object is described. The method of building a 3D printed object can comprise (A) adding at least one first electron donor compound to a build material comprising at least one polymer; and (B) adding at least one surfactant, at least one second electron donor compound, or combinations thereof to a fusing agent comprising: a metal bis(dithiolene) complex, a polar aprotic solvent, and water, wherein the at least one first electron donor compound and the at least one second electron donor compound are the same or different.

In some examples, the method of building a 3D printed object can further comprise: (C) depositing the build material on a substrate; (D) jetting the fusing agent on the deposited build material; and (E) subjecting the fusing agent and the build material to a temperature of from about 50° C. to about 300° C. to obtain the 3D printed object.

In some examples, the polar aprotic solvent in the above method can be selected from the group consisting of 1-methyl-2-pyrrolidone, 2-pyrrolidone, 1-(2-hydroxyethyl)-2-pyrrolidone, dimethylformamide (DMF), dimethyl sulfoxide (DMSO), and combinations thereof.

In some examples, the surfactant in the above method can be a thiol surfactant selected from the group consisting of dodecanethiol, 1-undecanethiol, 2-ethylhexanethiol, 1-octanethiol, 1-tetradecanethiol, and combinations thereof.

In some examples, the at least one first electron donor compound and the at least one second electron donor compound in the above method can comprise at least one hindered amine light stabilizer compound. In some examples, the at least one hindered amine light stabilizer compound in the above method can comprise bis(2,2,6,6,-tetramethyl-4-piperidyl)sebacate.

Referring now to FIG. 1, an example of a 3D printing system 10 is schematically depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The printing system 10 includes a build area platform 12, a build material supply 14 containing polymeric or polymeric composite build material particles 16, and a build material distributor 18.

As used herein, "polymeric or polymeric composite build material particles 16" includes at least one polymer and at least one first electron donor compound, as described hereinabove.

The build area platform 12 receives the polymeric or polymeric composite build material 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is also one example, and could be replaced with another support member, such as a platen, a fabrication/print bed, a glass plate, or another build surface.

The build area platform 12 may be moved in a direction as denoted by the arrow 20, e.g., along the z-axis, so that polymeric or polymeric composite build material 16 may be delivered to the platform 12 or to a previously formed layer of the 3D part. In an example, when the polymeric or polymeric composite build material particles 16 are to be delivered, the build area platform 12 may be programmed to advance (e.g., downward) enough so that the build material distributor 18 can push the polymeric or polymeric composite build material particles 16 onto the platform 12 to form a substantially uniform layer of the polymeric or polymeric composite build material 16 thereon (see, e.g., FIGS. 2A and 2B). The build area platform 12 may also be returned to its original position, for example, when a new part is to be built.

The build material supply 14 may be a container, bed, or other surface that is to position the polymeric or polymeric composite build material particles 16 between the build material distributor 18 and the build area platform 12. In some examples, the build material supply 14 may include a surface upon which the polymeric or polymeric composite build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to, for example, move the polymeric or polymeric composite build material particles 16 from a storage location to a position to be spread onto the build area platform 12 or onto a previously formed layer of the 3D part.

The build material distributor 18 may be moved in a direction as denoted by the arrow 22, e.g., along the y-axis, over the build material supply 14 and across the build area platform 12 to spread a layer of the polymeric or polymeric composite build material 16 over the build area platform 12. The build material distributor 18 may also be returned to a position adjacent to the build material supply 14 following the spreading of the polymeric or polymeric composite build material particles 16. The build material distributor 18 may be a blade (e.g., a doctor blade), a roller, a combination of a roller and a blade, and/or any other device capable of spreading the polymeric or polymeric composite build material 16 over the build area platform 12. For instance, the build material distributor 18 may be a counter-rotating roller.

The polymeric or polymeric composite build material particles 16 may be a polymeric build material or a polymeric composite build material. As used herein, the term "polymeric build material" may refer to crystalline or semi-crystalline polymer particles. As used herein, the term "polymeric composite build material" may refer or composite particles made up of polymer and ceramic. Any of the polymeric or polymeric composite build material particles 16 may be in powder form.

Examples of semi-crystalline polymers include semi-crystalline thermoplastic materials with a wide processing window of greater than 5° C. (i.e., the temperature range between the melting point and the re-crystallization temperature). Some specific examples of the semi-crystalline thermoplastic materials include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, or combinations thereof). Other examples of crystalline or semi-crystalline polymers suitable for use as the build material particles 16 include polyethylene, polypropylene, and polyoxomethylene (i.e., polyacetals). Still other examples of suitable build material particles 16 include polystyrene, polycarbonate, polyester, polyurethanes, other engineering plastics, and blends of any two or more of the polymers listed herein.

Any of the previously listed crystalline or semi-crystalline polymer particles may be combined with ceramic particles to form the polymeric composite build material particles 16. Examples of suitable ceramic particles include metal oxides, inorganic glasses, carbides, nitrides, and borides. Some specific examples include alumina ($Al_2O_3$), glass, silicon mononitride (SiN), silicon dioxide ($SiO_2$), zirconia ($ZrO_2$), titanium dioxide ($TiO_2$), or combinations thereof. The amount of ceramic particles that may be combined with the crystalline or semi-crystalline polymer particles may depend on the materials used and the 3D part to be formed. In one example, the ceramic particles may be present in an amount ranging from about 1 wt % to about 20 wt % based on the total weight of the polymeric composite build material particles 16.

The polymeric or polymeric composite build material particles 16 may have a melting point or softening point ranging from about 50° C. to about 400° C. As an example, the build material particles 16 may be a polyamide having a melting point of 180° C.

The polymeric or polymeric composite build material particles 16 may be made up of similarly sized particles or differently sized particles. The term "size", as used herein with regard to the polymeric or polymeric composite build material particles 16, refers to the diameter of a spherical particle, or the average diameter of a non-spherical particle (i.e., the average of multiple diameters across the particle), or the volume-weighted mean diameter of a particle distribution. In an example, the average size of the polymeric or polymeric composite build material particles 16 ranges from 5 μm to about 200 μm.

It is to be understood that the polymeric or polymeric composite build material 16 may include, in addition to polymeric or polymeric composite particles, a charging agent, a flow aid, or combinations thereof, as discussed hereinabove.

As shown in FIG. 1, the printing system 10 also includes an applicator 24, which may contain the fusing agent 26 disclosed herein.

As mentioned above, the fusing agent 26 may include (i) the metal bis(dithiolene) complex, (ii) the at least one surfactant, the at least one second electron donor compound, or combinations thereof, (iii) the polar aprotic solvent, and (iv) water.

The applicator 24 may be scanned across the build area platform 12 in the direction indicated by the arrow 28, e.g., along the y-axis. The applicator 24 may be, for instance, a thermal inkjet printhead, a piezoelectric printhead, or a continuous inkjet printhead, and may extend a width of the build area platform 12. While the applicator 24 is shown in FIG. 1 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the fusing agent 26 over a large area of a layer of polymeric or polymeric composite build material particles 16. The applicator 24 may thus be attached to a moving XY stage or a translational carriage (neither of which is shown) that moves the applicator 24 adjacent to the build area platform 12 in order to deposit the fusing agent 26 in predetermined areas of a layer of the polymeric or polymeric composite build material particles 16 that has been formed on the build area platform 12 in accordance with the method(s) disclosed herein. The applicator 24 may include a plurality of nozzles (not shown) through which the fusing agent 26 is to be ejected.

The applicator 24 may deliver drops of the fusing agent 26 at a resolution ranging from about 300 dots per inch (DPI) to about 1200 DPI. In other examples, the applicator 24 may deliver drops of the fusing agent 26 at a higher or lower resolution. The drop velocity may range from about 5 m/s to about 24 m/s and the firing frequency may range from about 1 kHz to about 100 kHz. In one example, each drop may be in the order of about 10 picoliters (pl) per drop, although it is contemplated that a higher or lower drop size may be used. In some examples, applicator 24 is able to deliver variable size drops of the fusing agent 26.

In some examples of the system 10 disclosed herein, another applicator (not shown) may be included that is capable of applying a colored ink to the 3D part that is formed. This applicator may be similar to or the same as applicator 24. It may be beneficial to include this applicator and the colored ink when the 3D part is the color of the polymeric or polymeric composite build material (e.g., white or off-white), and when it is beneficial to apply color to the white or off-white 3D part.

An example of a pigment based colored ink may include from about 1 wt % to about 10 wt % of pigment(s), from about 10 wt % to about 30 wt % of co-solvent(s), from about 0.5 wt % to about 2 wt % of dispersant(s), from 0.01 wt % to about 1 wt % of anti-kogation agent(s), from about 0.1 wt % to about 5 wt % of binder(s), from about 0.05 wt % to about 0.1 wt % biocide(s), and a balance of water. An example of a dye based colored ink may include from about 1 wt % to about 7 wt % of dye(s), from about 10 wt/o to about 30 wt % of co-solvent(s), from about 0.25 wt % to about 2 wt % of dispersant(s), from 0.05 wt % to about 0.1 wt % of chelating agent(s), from about 0.005 wt % to about 0.2 wt % of buffer(s), from about 0.05 wt % to about 0.1 wt % biocide(s), and a balance of water. Some specific examples of suitable colored inks include a set of cyan, magenta, and yellow inks, such as C1893A (cyan), C1984A (magenta), and C1985A (yellow); or C4801A (cyan), C4802A (magenta), and C4803A (yellow); all of which are available from HP Inc. Other commercially available colored inks include C9384A (printhead HP 72), C9383A (printhead HP 72), C4901A (printhead HP 940), and C4900A (printhead HP 940).

Each of the previously described physical elements may be operatively connected to a controller 30 of the printing system 10. The controller 30 may control the operations of the build area platform 12, the build material supply 14, the build material distributor 18, and the applicator 24. As an example, the controller 30 may control actuators (not shown) to control various operations of the 3D printing system 10 components. The controller 30 may be a computing device, a semiconductor-based microprocessor, a central processing unit (CPU), an application specific integrated circuit (ASIC), and/or another hardware device. Although not shown, the controller 30 may be connected to the 3D printing system components via communication lines.

The controller 30 manipulates and transforms data, which may be represented as physical (electronic) quantities within the printer's registers and memories, in order to control the physical elements to create the 3D part. As such, the controller 30 is depicted as being in communication with a data store 32. The data store 32 may include data pertaining to a 3D part to be printed by the 3D printing system 10. The data for the selective delivery of the polymeric or polymeric composite build material particles 16 and the fusing agent 26 may be derived from a model of the 3D part to be formed. For instance, the data may include the locations on each layer of polymeric or polymer composite build material particles 16 that the applicator 24 is to deposit the fusing agent 26. In one example, the controller 30 may use the data to control the applicator 24 to selectively apply the fusing agent 26. The data store 32 may also include machine readable instructions (stored on a non-transitory computer readable medium) that are to cause the controller 30 to control the amount of polymeric or polymeric composite build material particles 16 that is supplied by the build material supply 14, the movement of the build area platform 12, the movement of the build material distributor 18, and/or the movement of the applicator 24.

As shown in FIG. 1, the printing system 10 may also include a source of electromagnetic radiation 34, 34'. In some examples, the source of electromagnetic radiation 34, 34' may be in a fixed position with respect to the build material platform 12. In other examples, the source of electromagnetic radiation 34, 34' may be positioned to expose the layer of polymeric or polymeric composite build material particles 16 to electromagnetic radiation immediately after the fusing agent 26 has been applied thereto. In the example shown in FIG. 1, the source of electromagnetic radiation 34' is attached to the side of the applicator 24 which allows for patterning and heating in a single pass.

The source of electromagnetic radiation 34, 34' may emit electromagnetic radiation having wavelengths ranging from about 800 nm to about 1 mm. As one example, the electromagnetic radiation may range from about 800 nm to about 2 μm. As another example, the electromagnetic radiation may be blackbody radiation with a maximum intensity at a wavelength of about 1100 nm. The source of electromagnetic radiation 34, 34' may be infrared (IR) or near-infrared light sources, such as IR or near-IR curing lamps, IR or near-IR light emitting diodes (LED), or lasers with the goal IR or near-IR electromagnetic wavelengths.

The source of electromagnetic radiation 34, 34' may be operatively connected to a lamp/laser driver, an input/output temperature controller, and temperature sensors, which are collectively shown as radiation system components 36. The radiation system components 36 may operate together to control the source of electromagnetic radiation 34, 34'. The temperature recipe (e.g., radiation exposure rate) may be submitted to the input/output temperature controller. During heating, the temperature sensors may sense the temperature of the polymeric or polymeric composite build material particles 16, and the temperature measurements may be transmitted to the input/output temperature controller. For example, a thermometer associated with the heated area can generate temperature feedback. The input/output temperature controller may adjust the source of electromagnetic radiation 34, 34' power set points based on any difference between the recipe and the real-time measurements. These power set points are sent to the lamp/laser drivers, which transmit appropriate lamp/laser voltages to the source of electromagnetic radiation 34, 34'. This is one example of the radiation system components 36, and it is to be understood that other radiation source control systems may be used. For example, the controller 30 may control the source of electromagnetic radiation 34, 34'.

Referring now to FIGS. 2A through 2D, an example of the 3D printing method 100 is depicted. This method 100 may be used to form 3D printed parts having mechanical integrity depending on individual materials (e.g., having an ultimate tensile strength ranging from about 40 MPa to about 55 MPa) and being white, off-white, or colored. In other examples, the ultimate tensile strength of the 3D printed part may range from about 40 MPa to about 51 MPa or from about 40 MPa to about 45 MPa.

Prior to execution of the method 100 or as part of the method 100, the controller 30 may access data stored in the data store 32 pertaining to a 3D part that is to be printed. The controller 30 may determine the number of layers of polymeric or polymeric composite build material 16 that are to be formed, and the locations at which the fusing agent 26 from the applicator 24 is to be deposited on each of the respective layers.

Figure 2A:
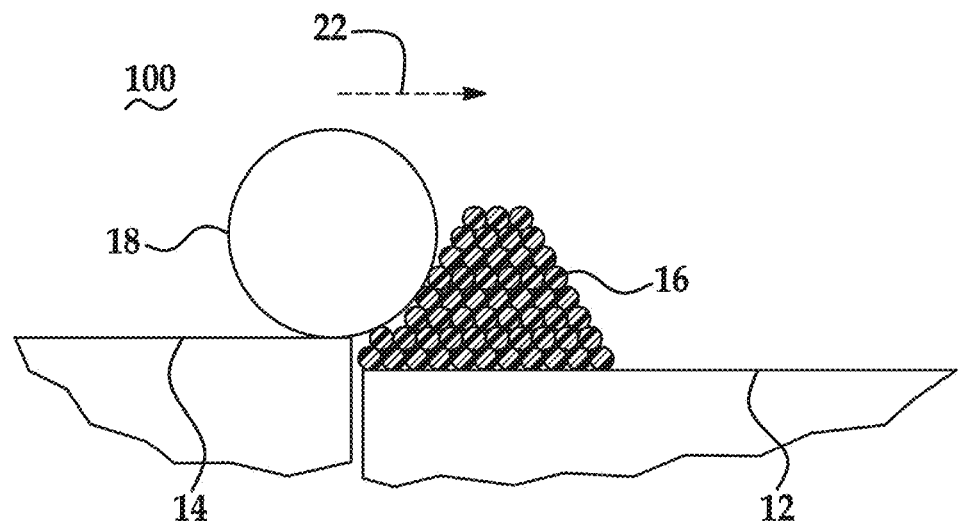
FIGS. 2A, 2B, 2C, and 2D are schematic and partial cross-sectional views depicting the formation of a 3D part using examples of a 3D printing method described herein.
Figure 2B:
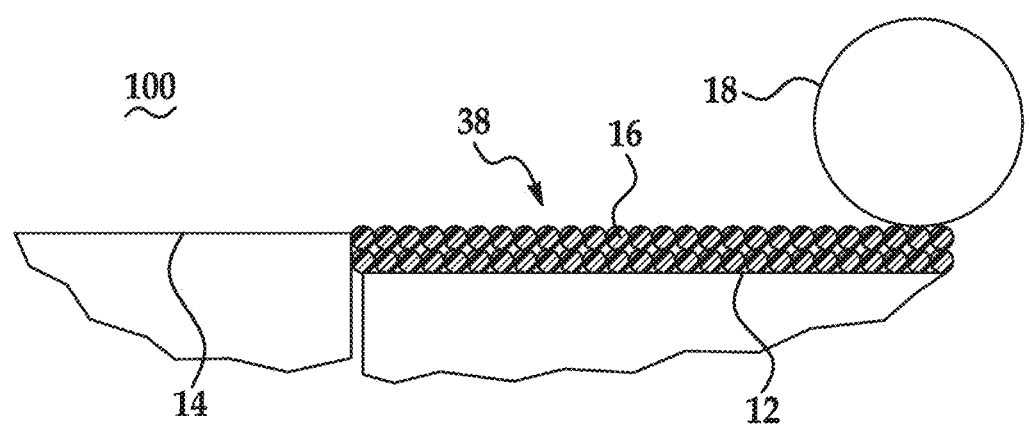

As shown in FIGS. 2A and 2B, the method 100 includes applying the polymeric or polymeric composite build material 16. In FIG. 2A, the build material supply 14 may supply the polymeric or polymeric composite build material particles 16 into a position so that they are ready to be spread onto the build area platform 12. In FIG. 2B, the build material distributor 18 may spread the supplied polymeric or polymeric composite build material particles 16 onto the build area platform 12. The controller 30 may execute control build material supply instructions to control the build material supply 14 to appropriately position the polymeric or polymeric composite build material particles 16, and may execute control spreader instructions to control the build material distributor 18 to spread the supplied polymeric or polymeric composite build material particles 16 over the build area platform 12 to form a layer 38 of polymeric or polymeric composite build material particles 16 thereon. As shown in FIG. 2B, one layer 38 of the polymeric or polymeric composite build material particles 16 has been applied.

The layer 38 has a substantially uniform thickness across the build area platform 12. In an example, the thickness of the layer 38 ranges from about 50 μm to about 300 μm, although thinner or thicker layers may also be used. For example, the thickness of the layer 38 may range from about 20 μm to about 500 μm, or from about 30 μm to about 300 μm. The layer thickness may be about 2× and/or about the same size as the particle diameter (as shown in FIG. 2B) for increased 3D part definition.

Prior to further processing, the layer 38 of the polymeric or polymeric composite build material particles 16 may be exposed to heating. Heating may be performed to pre-heat the polymeric or polymeric composite build material particles 16, and thus the heating temperature may be below the melting point or softening point of the polymeric or polymeric composite build material particles 16. As such, the temperature selected will depend upon the polymeric or polymeric composite build material particles 16 that are used. As examples, the pre-heating temperature may be from about 5° C. to about 50° C. below the melting point or softening point of the polymeric or polymeric composite build material particles 16. In an example, the pre-heating temperature ranges from about 50° C. to about 350° C. In another example, the pre-heating temperature ranges from about 150° C. to about 170° C.

Pre-heating the layer 38 of the polymeric or polymeric composite build material particles 16 may be accomplished using any suitable heat source that exposes all of the polymeric or polymeric composite build material particles 16 on the build material surface 12 to the heat. Examples of the heat source include a thermal heat source (e.g., a heater (not shown) of the particles 16) or the electromagnetic radiation source 34, 34'.

Figure 2C:
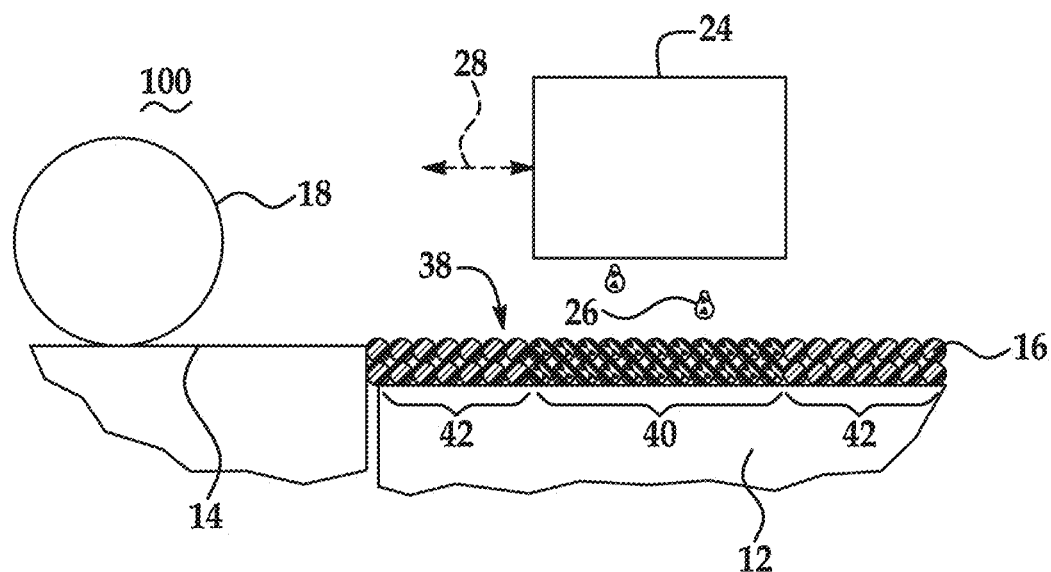

Referring now to FIG. 2C, after the layer 38 is formed, and in some instances is pre-heated, the fusing agent 26 is selectively applied on at least a portion 40 of the polymeric or polymeric composite build material 16.

It is to be understood that a single fusing agent 26 may be selectively applied on the portion 40, or multiple fusing agents 26 may be selectively applied on the portion 40. As an example, multiple fusing agents 26 may be used when the colorant is included in at least one of the multiple fusing agents 26 to create a multi-colored part.

As illustrated in FIG. 2C, the fusing agent 26 may be dispensed from the applicator 24. The controller 32 may execute instructions to control the applicator 24 (e.g., in the directions indicated by the arrow 28) to deposit the fusing agent 26 onto predetermined portion(s) 40 of the polymeric or polymeric composite build material 16 that are to become part of the 3D part. The applicator 24 may be programmed to receive commands from the controller 30 and to deposit the fusing agent 26 according to a pattern of a cross-section for the layer of the 3D part to be formed. As used herein, the cross-section of the layer of the 3D part to be formed refers to the cross-section that is parallel to the surface of the build area platform 12. In the example shown in FIG. 2C, the applicator 24 selectively applies the fusing agent 26 on those portion(s) 40 of the layer 38 that are to be fused to become the first layer of the 3D part. As an example, if the 3D part that is to be formed is to be shaped like a cube or cylinder, the fusing agent 26 will be deposited in a square pattern or a circular pattern (from a top view), respectively, on at least a portion of the layer 38 of the polymeric or polymeric composite build material particles 16. In the example shown in FIG. 2C, the fusing agent 26 is deposited in a square pattern on the portion 40 of the layer 38 and not on the portions 42.

As mentioned above, the fusing agent 26 may include the metal bis(dithiolene) complex and the liquid vehicle. In an example, the fusing agent 26 includes the metal bis(dithiolene) complex, the thiol surfactant, the polar aprotic solvent, and a balance of water. In another example, the fusing agent 26 consists of these components and no other components. In still another example, the fusing agent 26 includes from about 1 wt % to about 3 wt % of the metal bis(dithiolene) complex, from about 1 wt % to about 5 wt % of the thiol surfactant, from about 5 wt % to about 50 wt % of the polar aprotic solvent, and a balance of water (based on the total weight of the fusing agent 26). As also mentioned above, in some examples, the fusing agent 26 includes the colorant. In an example, the fusing agent 26 consists of the metal bis(dithiolene) complex, the thiol surfactant, the polar aprotic solvent, the colorant, and a balance of water. In still other examples, the fusing agent 26 excludes the colorant.

The volume of the fusing agent 26 that is applied per unit of the polymeric or polymeric composite build material 16 in the patterned portion 40 may be sufficient to absorb and convert enough electromagnetic radiation so that the polymeric or polymeric composite build material 16 in the patterned portion 40 will fuse. The volume of the fusing agent 26 that is applied per unit of the polymer or polymeric composite build material 16 may depend, at least in part, on the metal bis(dithiolene) complex used, the metal bis(dithiolene) complex loading in the fusing agent 26, and the polymeric or polymeric composite build material 16 used.

Figure 2D:
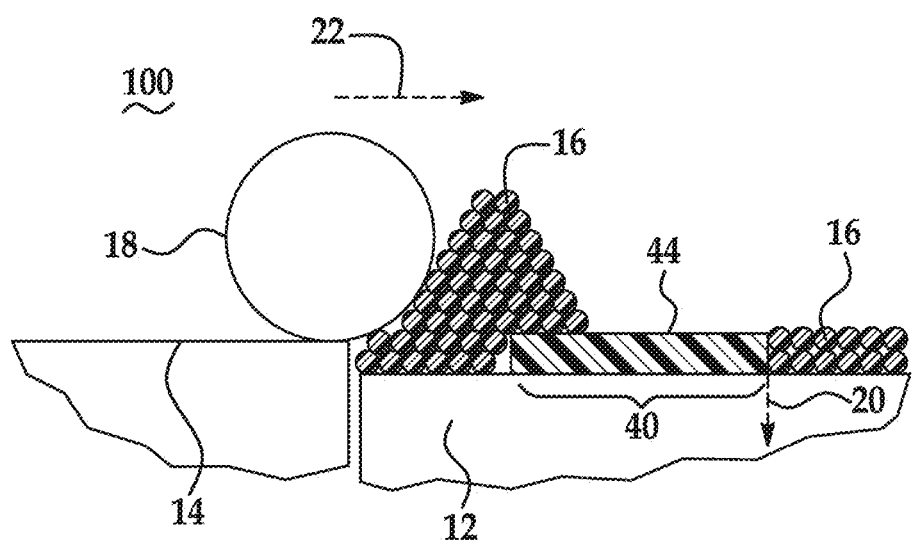

As shown between FIGS. 2C and 2D, after applying the fusing agent 26, the entire layer 38 of the polymeric or polymeric composite build material 16 is exposed to electromagnetic radiation (shown as EMR Exposure between FIGS. 2C and 2D).

The electromagnetic radiation is emitted from the source of electromagnetic radiation 34, 34' (shown in FIG. 1). The length of time the electromagnetic radiation is applied for, or energy exposure time, may be dependent, for example, on at least one of: characteristics of the electromagnetic radiation 34, 34'; characteristics of the polymeric or polymeric composite build material particles 16; and/or characteristics of the fusing agent 26.

The fusing agent 26 enhances the absorption of the radiation, converts the absorbed radiation to thermal energy, and promotes the transfer of the thermal heat to the polymeric or polymeric composite build material particles 16 in contact therewith. In an example, the fusing agent 26 sufficiently elevates the temperature of the polymeric or polymeric composite build material particles 16 in layer 38 above the melting or softening point of the particles 16, allowing fusing (e.g., sintering, binding, and curing) of the polymeric or polymeric composite build material particles 16 to take place. Exposure to electromagnetic radiation forms the fused layer 44, as shown in FIG. 2D.

It is to be understood that portions 42 of the polymeric or polymeric composite build material 16 that do not have the fusing agent 26 applied thereto may not absorb enough radiation to fuse. As such, these portions 42 may not become part of the 3D part that is ultimately formed. The polymeric or polymeric composite build material 16 in portions 42 may be reclaimed to be reused as build material in the printing of another 3D part.

The processes shown in FIGS. 2A through 2D may be repeated to iteratively build up several fused layers and to form the 3D printed part. FIG. 2D illustrates the initial formation of a second layer of polymeric or polymeric composite build material particles 16 on the previously formed layer 44. In FIG. 2D, following the fusing of the predetermined portion(s) 40 of the layer 38 of polymeric or polymeric composite build material 16, the controller 30 may execute instructions to cause the build area platform 12 to be moved a relatively small distance in the direction denoted by the arrow 20. In other words, the build area platform 12 may be lowered to enable the next layer of polymeric or polymeric composite build material particles 16 to be formed. For example, the build material platform 12 may be lowered a distance that is equivalent to the height of the layer 38. In addition, following the lowering of the build area platform 12, the controller 30 may control the build material supply 14 to supply additional polymeric or polymeric composite build material particles 16 (e.g., through operation of an elevator, an auger, or the like) and the build material distributor 18 to form another layer of polymeric or polymeric composite build material particles 16 on top of the previously formed layer with the additional polymeric or polymeric composite build material 16. The newly formed layer may be in some instances preheated, patterned with the fusing agent 26, and then exposed to radiation from the source of electromagnetic radiation 34, 34' to form the additional fused layer.

Since the metal bis(dithiolene) complex is further reduced and becomes colorless at least during fusing, the layer 44 (and the final 3D part) exhibits a color of the build material (e.g., white or off-white) or exhibits a color of a colorant present in the fusing agent 26. In the latter example, if it can be beneficial to impart color to the layer 44, the colored ink may be selectively applied to at least a portion of the layer 44.

Unless otherwise stated, any feature described hereinabove can be combined with any example or any other feature described herein.

In describing and claiming the examples disclosed herein, the singular forms "a," "an," and "the" include plural referents unless the context clearly dictates otherwise.

It is to be understood that concentrations, amounts, and other numerical data may be expressed or presented herein in range formats. It is to be understood that such range formats are used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same applies to ranges reciting a single numerical value.

Reference throughout the specification to "one example," "some examples," "another example," "an example," and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Unless otherwise stated, references herein to "wt %" of a component are to the weight of that component as a percentage of the whole composition comprising that component. For example, references herein to "wt %" of, for example, a solid material such as polyurethane(s) or colorant(s) dispersed in a liquid composition are to the weight percentage of those solids in the composition, and not to the amount of that solid as a percentage of the total non-volatile solids of the composition.

If a standard test is mentioned herein, unless otherwise stated, the version of the test to be referred to is the most recent at the time of filing this patent application.

All amounts disclosed herein and in the examples below are in wt % unless indicated otherwise.

To further illustrate the present disclosure, examples are given herein. It is to be understood that these examples are presented for illustrative reasons and are not to be construed as limiting the scope of the present disclosure.

EXAMPLES

Example 1

A 3D printing composition was prepared as shown below in Table 1 (build material) and Tables 2 and 3 (fusing agent).

TABLE 1

| Ingredient | Specific component | Build Material (wt %) |
|---|---|---|
| Polymer | PA12 | 96 |
| Electron Donor Compound | TINUVIN ® 770 | 2 |
| Additives | Flow Aid and Charging Agent | 2 |

TABLE 2

| Ingredient | Specific component | Fusing agent (wt %) |
|---|---|---|
| Polar aprotic solvent | 1-methyl-2-pyrrolidone | 83 |
| Thiol surfactant | Dodecanethiol (in water) | 10 |
| Metal bis(dithiolene) complex | Nickel dithiolene | 5 |
| Electron Donor Compound | TINUVIN ® 770 | 2 |

The nickel dithiolene, in the presence of TINUVIN® 770 and dodecanethiol, was readily reduced and dissolved in the 1-methyl-2-pyrrolidone within seconds at room temperature. The nickel dithiolene changed colors from green (before reduction) to reddish brown (after reduction).

The composition of Table 2 was incorporated into a vehicle to form a fusing agent. The general formulation of the vehicle is shown in Table 3, with the wt % of each component that was used.

TABLE 3

| Ingredient | Specific component | Vehicle (wt %) |
|---|---|---|
| Co-solvent | 1-methyl-2-pyrrolidone | 40 |
| Emulsifier | CRODAFOS ® O3A | 1 |
| Surface tension reduction agent | SURFYNOL ® SEF | 1.5 |
| Wetting agent | CAPSTONE ™ FS-35 | 0.10 |
| Scale inhibitor/Anti-deceleration agent | DOWFAX ™ 2A1 | 0.20 |
| Chelating agent | TRILON ® M | 0.08 |
| Biocide | PROXEL ® GXL | 0.36 |
|  | DI (deionized) Water | Balance |

The fusing agent included about 50 wt % of the composition of Table 2, about 40 wt % of the vehicle composition of Table 3, and about 10 wt % of deionized water (in addition to the water already present in the vehicle).

Comparative Example 1

A 3D printing composition was prepared as shown below in Table 4 (build material) and Tables 5 and 6 (fusing agent).

TABLE 4

| Ingredient | Specific component | Build Material (wt %) |
|---|---|---|
| Polymer | PA12 | 98 |
| Additives | Flow Aid and Charging Agent | 2 |

TABLE 5

| Ingredient | Specific component | Fusing agent (wt %) |
|---|---|---|
| Polar aprotic solvent | 1-methyl-2-pyrrolidone | 83 |
| Thiol surfactant | Dodecanethiol (in water) | 10 |
| Metal bis(dithiolene) complex | Nickel dithiolene | 5 |
| Electron Donor Compound | TINUVIN ® 770 | 2 |

The nickel dithiolene, in the presence of TINUVIN® 770 and dodecanethiol, was readily reduced and dissolved in the 1-methyl-2-pyrrolidone within seconds at room temperature. The nickel dithiolene changed colors from green (before reduction) to reddish brown (after reduction).

The composition of Table 5 was incorporated into a vehicle to form a fusing agent. The general formulation of the vehicle is shown in Table 6, with the wt % of each component that was used.

TABLE 6

| Ingredient | Specific component | Vehicle (wt %) |
|---|---|---|
| Co-solvent | 1-methyl-2-pyrrolidone | 40 |
| Emulsifier | CRODAFOS ® O3A | 1 |
| Surface tension reduction agent | SURFYNOL ® SEF | 1.5 |
| Wetting agent | CAPSTONE ® FS-35 | 0.10 |
| Scale inhibitor/Anti-deceleration agent | DOWFAX ™ 2A1 | 0.20 |
| Chelating agent | TRILON ® M | 0.08 |
| Biocide | PROXEL ® GXL | 0.36 |
|  | DI (deionized) Water | Balance |

The fusing agent included about 50 wt % of the composition of Table 5, about 40 wt % of the vehicle composition of Table 6, and about 10 wt % of deionized water (in addition to the water already present in the vehicle).

Example 2

An example 3D part was printed using the build material (Table 1) and the fusing agent (Tables 2 and 3)—from Example 1.

For each example part, the fusing agent (Tables 2 and 3) was thermal inkjet printed with a HP761 printhead (manufactured by Hewlett-Packard Company) in a pattern on a portion of the build material (Table 1) in subsequent layers. Each layer was about 100 μm in thickness. New layers were spread onto the fabrication bed from a supply region using a roller. The temperature of the supply region was set at 115° C. The temperature of the printing region was set at 155° C. with a platen underneath it heated to 148° C.

The example part was printed having a strength of about 100 contone (which refers to the number of drops, which is divided by 256, that will be placed on average onto each pixel). The example part was then exposed to high-intensity light from a halogen lamp with a power ranging from about 500 watts to 750 watts and a color temperature ranging from about 2700 K to about 3400 K passing over the fabrication bed with a fusing speed ranging from about 20 inches per second (ips) to about 30 ips. After fusing, the nickel dithiolene was further reduced from its reddish brown form to its colorless form. After the layers were printed, the example part was removed from the fabrication bed. The example part was not subjected to any further post treatment.

Figure 3A:
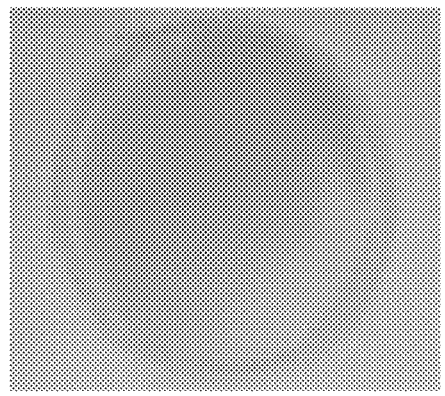
FIG. 3A is a photograph of a 3D printed part according to a 3D composition described herein.

FIG. 3A shows that TINUVIN® 770 (i.e., bis(2,2,6,6,-tetramethyl-4-piperidyl)sebacate) when added to the build material can increase the reduction of the nickel dithiolene to the colorless form.

Comparative Example 2

An example 3D part was printed using the build material (Table 4) and the fusing agent (Tables 5 and 6)—from Comparative Example 1.

For each example part, the fusing agent (Tables 5 and 6) was thermal inkjet printed with a HP761 printhead (manufactured by Hewlett-Packard Company) in a pattern on a portion of the build material (Table 4) in subsequent layers. Each layer was about 100 μm in thickness. New layers were spread onto the fabrication bed from a supply region using a roller. The temperature of the supply region was set at 115° C. The temperature of the printing region was set at 155° C. with a platen underneath it heated to 148° C.

The example part was printed having a strength of about 100 contone. The example part was then exposed to high-intensity light from a halogen lamp with a power ranging from about 500 watts to 750 watts and a color temperature ranging from about 2700 K to about 3400 K passing over the fabrication bed with a fusing speed ranging from about 20 inches per second (ips) to about 30 ips. After fusing, the nickel dithiolene was further reduced from its reddish brown form to its colorless form. After the layers were printed, the example part was removed from the fabrication bed. The example part was not subjected to any further post treatment.

Figure 3B:
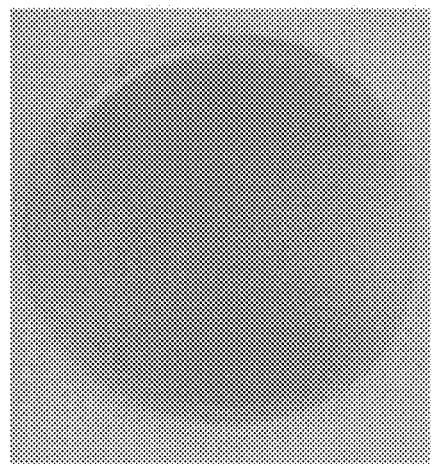
FIG. 3B is a photograph of a 3D printed part according to a comparative 3D composition.

FIG. 3B shows that when no antioxidant is added to the build material, the nickel dithiolene maintains a reddish brown color and does not become colorless.

The above examples show that when an electron donor compound is not added to the build material, the 3D part maintains a reddish brown color (FIG. 3B). However, when an electron donor compound is added to the build material, the 3D part can become colorless (FIG. 3A).

The examples show that the addition of an electron donor compound (e.g., bis(2,2,6,6,-tetramethyl-4-piperidyl)sebacate) to the build material can enhance the discoloration of fusing agent when printing at higher contone level, generating functional white or colored parts with good mechanical performance. Further, adding the electron donor compound can also reduce the oxidative degradation of the polymer in the build material during thermal processing.

While several examples have been described in detail, it is to be understood that the disclosed examples may be modified. Therefore, the foregoing description is to be considered non-limiting.

What is claimed is:

1. A composition for 3D printing comprising:
   a build material comprising at least one polymer and at least one first electron donor compound; and
   a fusing agent comprising:
   (i) a reduced form of a metal bis(dithiolene) complex having a general formula I:

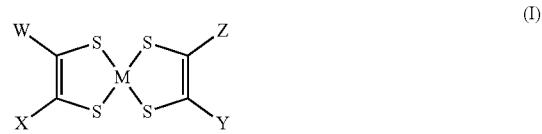

(I)

wherein:
   M is a metal selected from the group consisting of nickel, zinc, platinum, palladium, and molybdenum; and
   each of W, X, Y, and Z is selected from the group consisting of H, Ph, PhR, and SR, wherein Ph is a phenyl group and R is selected from the group consisting of $C_nH_{2n+1}$, $OC_nH_{2n+1}$, and $N(CH_3)_2$, wherein $2 \leq n \leq 12$,
   (ii) at least one surfactant, at least one second electron donor compound, or combinations thereof,
   (iii) a polar aprotic solvent present in an amount sufficient to reduce the metal bis(dithiolene) complex in monoanionic form or in dianionic form, and
   (iv) water,
   wherein the at least one first electron donor compound and the at least one second electron donor compound are the same or different.

2. The composition according to claim 1, wherein the at least one first electron donor compound and the at least one second electron donor compound comprise at least one hindered amine light stabilizer compound.

3. The composition according to claim 2, wherein the at least one hindered amine light stabilizer compound comprises bis(2,2,6,6,-tetramethyl-4-piperidyl)sebacate.

4. The composition according to claim 1, wherein the polar aprotic solvent is selected from the group consisting of 1-methyl-2-pyrrolidone, 2-pyrrolidone, 1-(2-hydroxyethyl)-2-pyrrolidone, dimethylformamide (DMF), dimethyl sulfoxide (DMSO), and combinations thereof.

5. The composition according to claim 1, wherein the surfactant is a thiol surfactant selected from the group consisting of dodecanethiol, 1-undecanethiol, 2-ethylhexanethiol, 1-octanethiol, 1-tetradecanethiol, and combinations thereof.

6. The composition according to claim 1, wherein:
the reduced form of the metal bis(dithiolene) complex is present in the fusing agent in an amount ranging from about 1 wt % to about 10 wt % based on the total weight of the fusing agent;
the at least one first electron donor compound is present in the build material in an amount ranging from about 0.1 wt % to about 3 wt % based on the total weight of the build material;
the at least one second electron donor compound is present in the fusing agent in an amount ranging from about 1 wt % to about 10 wt % based on the total weight of the fusing agent; and
the polar aprotic solvent is present in the fusing agent in an amount ranging from about 5 wt % to about 50 wt % based on the total weight of the fusing agent.

7. A method of using the composition according to claim 1 comprising:
depositing the composition according to claim 1 on a substrate during 3D printing.

8. The composition according to claim 1, wherein:

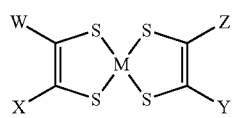

the at least one first electron donor compound and the at least one second electron donor compound comprise hindered amine light stabilizer compounds, and
the surfactant is a thiol surfactant selected from the group consisting of dodecanethiol, 1-undecanethiol, 2-ethylhexanethiol, 1-octanethiol, 1-tetradecanethiol, and combinations thereof.

9. The composition according to claim 1, wherein each of W, X, Y, and Z in formula I is selected from the group consisting of H, Ph, and PhR.

10. The composition according to claim 1, wherein an absorption maximum of the reduced form of the metal bis(dithiolene) complex is shifted from an absorption maximum of the metal bis(dithiolene) complex.

11. A method of building a 3D printed object comprising:
(A) adding at least one first electron donor compound to a build material comprising at least one polymer; and (B) adding at least one surfactant, at least one second electron donor compound, or combinations thereof to a fusing agent comprising:
a reduced form of a metal bis(dithiolene) complex having a general formula I:

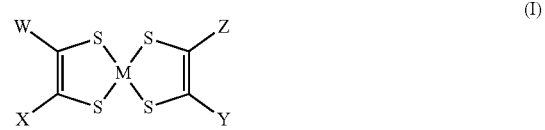

wherein:
M is a metal selected from the group consisting of nickel, zinc, platinum, palladium, and molybdenum; and
each of W, X, Y, and Z is selected from the group consisting of H, Ph, PhR, and SR, wherein Ph is a phenyl group and R is selected from the group consisting of $C_nH_{2n+1}$, $OC_nH_{2n+1}$, and $N(CH_3)_2$, wherein $2 \leq n \leq 12$,
a polar aprotic solvent present in an amount sufficient to reduce the metal bis(dithiolene) complex in mono-anionic form or in dianionic form, and water,
wherein the at least one first electron donor compound and the at least one second electron donor compound are the same or different.

12. The method of claim 11 further comprising:
(C) depositing the build material on a substrate;
(D) jetting the fusing agent on the deposited build material; and
(E) subjecting the fusing agent and the build material to a temperature of from about 50° C. to about 300° C. to obtain the 3D printed object.

13. The method according to claim 11, wherein the polar aprotic solvent is selected from the group consisting of 1-methyl-2-pyrrolidone, 2-pyrrolidone, 1-(2-hydroxyethyl)-2-pyrrolidone, dimethylformamide (DMF), dimethyl sulfoxide (DMSO), and combinations thereof.

14. The method according to claim 11, wherein the surfactant is a thiol surfactant selected from the group consisting of dodecanethiol, 1-undecanethiol, 2-ethylhexanethiol, 1-octanethiol, 1-tetradecanethiol, and combinations thereof.

15. The method according to claim 11, wherein the at least one first electron donor compound and the at least one second electron donor compound comprise at least one hindered amine light stabilizer compound.

16. The method according to claim 15, wherein the at least one hindered amine light stabilizer compound comprises bis(2,2,6,6,-tetramethyl-4-piperidyl)sebacate.

17. A composition for 3D printing comprising:
a build material comprising at least one polymer and at least one first electron donor compound; and
a fusing agent consisting of:
(i) a reduced form of a metal bis(dithiolene) complex having a general formula I:

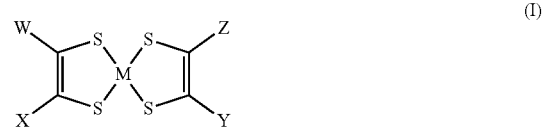

wherein:
- M is a metal selected from the group consisting of nickel, zinc, platinum, palladium, and molybdenum; and
- each of W, X, Y, and Z is selected from the group consisting of H, Ph, PhR, and SR, wherein Ph is a phenyl group and R is selected from the group consisting of $C_nH_{2n+1}$, $OC_nH_{2n+1}$, and $N(CH_3)_2$, wherein $2 \leq n \leq 12$, (ii) at least one surfactant, at least one second electron donor compound, or combinations thereof, (iii) a polar aprotic solvent present in an amount sufficient to reduce the metal bis(dithiolene) complex in monoanionic form or in dianionic form, (iv) an optional additive selected from the group consisting of a water soluble co-solvent, an emulsifier, a surface tension reduction agent, a wetting agent, a scale inhibitor, an anti-deceleration agent, a chelating agent, an antimicrobial agent, and a combination thereof, and (v) a balance of water, wherein the at least one first electron donor compound and the at least one second electron donor compound are the same or different.

* * * * *